US010859452B2

(12) United States Patent
Orihara et al.

(10) Patent No.: US 10,859,452 B2
(45) Date of Patent: Dec. 8, 2020

(54) SURFACE REFRACTIVE INDEX MEASUREMENT METHOD AND SURFACE STRESS MEASUREMENT METHOD USING THE SAME

(71) Applicants: ORIHARA INDUSTRIAL CO., LTD., Toshima-ku (JP); AGC Inc., Chiyoda-ku (JP)

(72) Inventors: Shuji Orihara, Toshima-ku (JP); Yoshio Orihara, Toshima-ku (JP); Satoshi Ogami, Chiyoda-ku (JP)

(73) Assignees: ORIHARA INDUSTRIAL CO., LTD., Toshima (JP); AGC Inc., Chiyoda (JP)

( * ) Notice: Subject to any disclaimer, the term of this patent is extended or adjusted under 35 U.S.C. 154(b) by 373 days.

(21) Appl. No.: 16/020,195

(22) Filed: Jun. 27, 2018

(65) Prior Publication Data
US 2018/0306658 A1 Oct. 25, 2018

Related U.S. Application Data

(63) Continuation of application No. PCT/JP2016/088964, filed on Dec. 27, 2016.

(30) Foreign Application Priority Data

Dec. 28, 2015 (JP) .................................. 2015-256395

(51) Int. Cl.
*G01L 1/24* (2006.01)
*G01N 21/41* (2006.01)
(Continued)

(52) U.S. Cl.
CPC .............. *G01L 1/241* (2013.01); *G01B 11/16* (2013.01); *G01B 11/18* (2013.01); *G01N 21/41* (2013.01);
(Continued)

(58) Field of Classification Search
CPC ....................................................... G01L 1/241
(Continued)

(56) References Cited

U.S. PATENT DOCUMENTS 8,778,496 B2 7/2014 Hart
2014/0368808 A1* 12/2014 Roussev .................. G01L 1/24
356/32

FOREIGN PATENT DOCUMENTS

JP 53-136886 11/1978
JP 55-33675 3/1980
(Continued)

OTHER PUBLICATIONS

Kishii, T., "Surface Stress Measurement Using Optical Waveguide Effect of Chemically Tempered Glass," Feb. 24, 1978, pp. 8 (with English Abstract).

*Primary Examiner* — Walter L Lindsay, Jr.
*Assistant Examiner* — Philipmarcus T Fadul
(74) *Attorney, Agent, or Firm* — Oblon, McClelland, Maier & Neustadt, L.L.P.

(57) ABSTRACT

Disclosed is a method of measuring a surface refractive index of a strengthened glass including causing light to enter a surface layer of the strengthened glass through a liquid provided with a refractive index equivalent to that of a surface of the surface layer; a process of causing the light to be emitted from the strengthened glass through the liquid; converting two types of light components into two types of emission line sequences; capturing an image of the two types of emission line sequences; measuring positions of respective emission lines of the two types of emission line sequences from the image; and calculating refractive indexes of a surface of the strengthened glass corresponding to the two types of light components, or refractive index distributions of the strengthened glass in a depth direction
(Continued)

from the surface corresponding to the two types of light components.

29 Claims, 13 Drawing Sheets

(51) Int. Cl.
    *G01N 21/43*     (2006.01)
    *G01B 11/16*     (2006.01)

(52) U.S. Cl.
    CPC ......... *G01N 21/4133* (2013.01); *G01N 21/43* (2013.01); *G01N 2021/4166* (2013.01); *G01N 2021/434* (2013.01)

(58) Field of Classification Search
    USPC .......................................................... 73/800
    See application file for complete search history.

(56) References Cited

FOREIGN PATENT DOCUMENTS

| | | |
|---|---|---|
| JP | 2014-28730 | 2/2014 |
| JP | 2016-24002 | 2/2016 |
| WO | WO2016/185934 A1 | 11/2016 |

\* cited by examiner

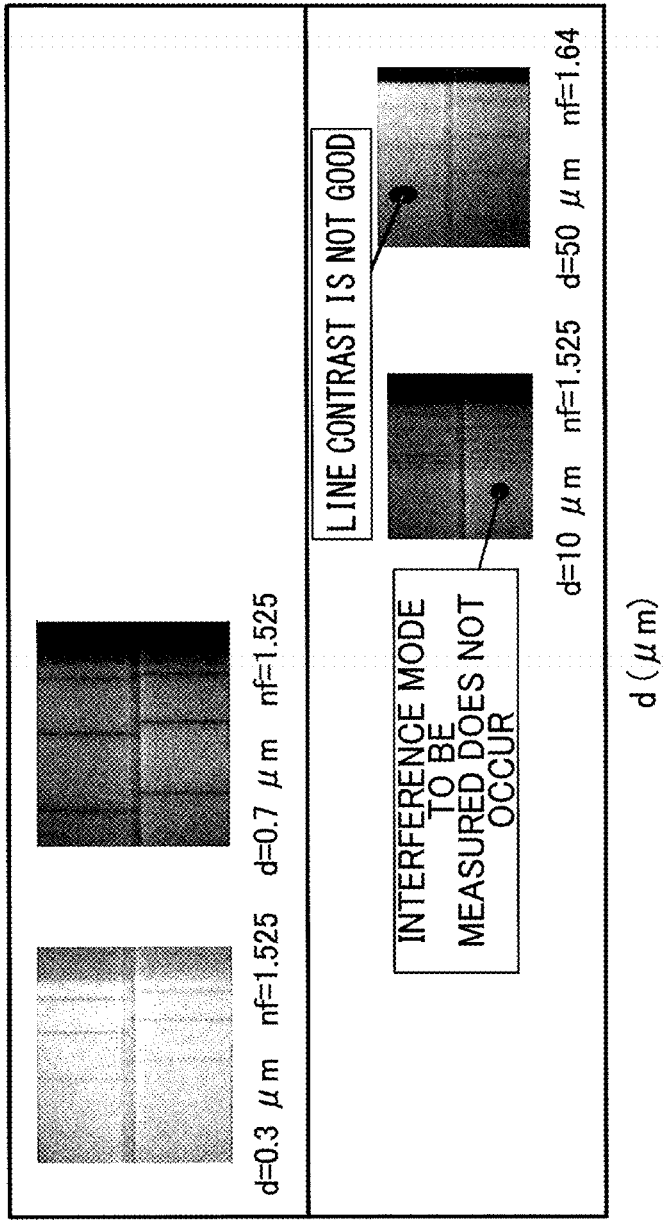

SURFACE REFRACTIVE INDEX MEASUREMENT METHOD AND SURFACE STRESS MEASUREMENT METHOD USING THE SAME

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/088964 filed on Dec. 27, 2016 and designating the U.S., which claims priority of Japanese Patent Application No. 2015-256395 filed on Dec. 28, 2015. The entire contents of the foregoing applications are incorporated herein by reference.

BACKGROUND OF THE INVENTION

1. Field of the Invention

The present invention relates to a method of measuring a surface refractive index of a strengthened glass and a method of measuring surface stress of a strengthened glass.

2. Description of the Related Art

In an electronic device, such as a cellular phone and a smartphone, a glass is often used for a display or a case main body, and, in order to enhance the strength of the glass, a strengthened glass known as a chemically strengthened glass is used such that a surface layer is formed on a surface of the glass by ion exchange. A surface layer of a strengthened glass, such as a chemically strengthened glass, includes, at least, a compressive stress layer that exists at the surface side of the glass, in which compressive stress is generated due to ion exchange, and may include a tensile stress layer that exists at the inner part side of the glass. The tensile stress layer, in which tensile stress is generated, may be adjacent to the compressive stress layer. Strength of a strengthened glass depends on a stress value of a formed surface layer and a depth of a surface compressive stress layer. Accordingly, for development of the strengthened glass or for quality control during production of the strengthened glass, it is important to measure the stress value of the surface layer and the depth of the compressive stress layer, or a distribution of stress.

As a technique for measuring stress in a surface layer of a strengthened glass, for example, there is a technique for non-destructively measuring compressive stress in the surface layer (which is referred to as a non-destructive measuring technique, hereinafter) using an optical waveguiding effect and a photoelasticity effect when a refractive index of the surface layer of the strengthened glass is greater than a refractive index of an inner part of the strengthened glass. In the non-destructive measuring technique, monochromatic light enters a surface layer of a strengthened glass to generate a plurality of modes by an optical waveguiding effect, and light for which a ray trace is determined is output for each mode to form an image of a emission line corresponding to the mode by a convex lens. Note that a number of the formed bright lines is equal to a number of the modes.

Note that, for this non-destructive measuring technique, a configuration is adopted such that emission lines with two types of respective light components whose oscillating directions are a horizontal direction and a vertical direction with respect to an emission surface can be observed for the light output from the surface layer. Then, a refractive index of each of the light components is calculated from the position of the emission line corresponding to the mode 1, of the corresponding one of the two types of the light components, using a property that the light of the mode 1, which is the lowest order, passes through a side of the surface layer that is the closest to the surface, and stress in the vicinity of the surface of the strengthened glass is obtained from a difference between the two types of refractive indexes and a photoelastic constant of the glass (see Patent Document 1 (Japanese Unexamined Patent Publication No. S53-136886), for example).

A method of obtaining a depth of the compressive layer (see Non-Patent Document 1 (Yogyo-Kyokai-Shi 87{3}1979), for example) has been proposed such that the stress on the outermost surface of the glass (which is referred to as a surface stress value, hereinafter) is obtained by extrapolation from the positions of the emission lines corresponding to the mode 1 and the mode 2 under the principle of the above-described non-destructive measuring technique, and the depth of the compressive stress layer is obtained from a total number of the emission lines under the assumption that a refractive index distribution in the surface layer linearly varies.

Furthermore, it has been proposed to improve a surface stress measurement device, which is based on the above-described non-destructive measuring technique, to use infrared light as a light source, so that the surface stress can be measured for a glass with low optical transparency in a visible range (see Patent Document 2 (Japanese Unexamined Patent Publication No. 2014-28730), for example).

For a strengthened glass used for a display of an electronic device, such as a cellular phone and a smartphone, however, various functions are required. For example, these are an antiglare effect, an antimicrobial effect, an antifouling effect, etc. As a result, optical uniformity on the surface of the strengthened glass may be lost, and a refractive index of a surface layer may not be accurately measured, or the measurement of the refractive index of the surface layer may be completely impossible.

Namely, the problem is that, if the refractive index of the surface layer may not be accurately measured, a surface stress value, a depth of a compressive stress layer, or a stress distribution in a depth direction from the surface may not be accurately calculated.

For example, in order to obtain an antiglare effect, the surface of the strengthened glass may be roughened in shape to the extent of the wavelength of the visible light by etching, grinding, sandblasting, etc., as the antireflection processing. On the surface of the strengthened glass with this antiglare effect, optical flatness is extremely deteriorated. As a result, an emission line of the strengthened glass becomes unclear and it becomes difficult to recognize a precise position, and, thus, it becomes difficult to precisely measure the surface refractive index. Patent Document 3 (U.S. patent Ser. No. 08/778,496) describes an example in which the stress of the strengthened glass with the antiglare effect was measured. However, for actual measurement attempts, in almost all cases, the stripes were not clearly seen due to the antiglare effect. When an attempt was made to measure using a typical measuring device (FSM-6000 manufactured by Orihara Seisakusyo Co., Ltd.), automatic measurement was not possible, and measurement could not be performed with high accuracy.

Similarly, in a strengthened glass in which metal ions are diffused in a surface layer of the glass, such as an antibacterial glass or an antifouling glass, the refractive index distribution on the surface of the glass becomes large and the glass becomes optically uneven because a gradient of the refractive index rapidly becomes large in the surface layer. As a result, the emission line of the strengthened glass becomes unclear and a precise position may not be recognized, and, thus, it becomes difficult to precisely measure the surface refractive index.

Apart from the above, if chemical strengthening is repeated a plurality of times, the surface becomes rough and the emission line becomes unclear, and it becomes difficult to accurately measure the surface refractive index.

Similarly, in the glass manufactured by a float glass method, tin diffuses on the surface of the strengthened glass that contacts tin. Thus, the gradient of the refractive index rapidly becomes large in the surface layer and the refractive index distribution on the glass surface becomes large, and the glass becomes optically uneven. As a result, the emission line of the strengthened glass becomes unclear and it becomes difficult to recognize a precise position, and, thus, it becomes difficult to precisely measure the surface refractive index.

As described above, in the non-destructive measuring technique according to related art, guided light is utilized that propagates within the strengthened glass by repeating reflection on the surface of the strengthened glass. Accordingly, when the optical flatness on the surface of the strengthened glass becomes poor, the emission line becomes unclear and it becomes impossible to recognize a precise position. As a result, it becomes difficult to precisely measure the surface refractive index. The same applies when the uniformity of the refractive index on the surface of the strengthened glass is low.

The present invention is achieved in view of the above-described point, and an object is to provide a surface refractive index measurement method by which a refractive index distribution in a surface layer of a strengthened glass can be accurately measured in a non-destructive manner, even if an optical flatness on the surface of the strengthened glass is low or even if uniformity of the refractive index on the surface of the strengthened glass is low, and to provide a surface stress measurement method using the method above.

SUMMARY OF THE INVENTION

The surface refractive index measurement method is a method of measuring a surface refractive index of a strengthened glass, and it is required that the method includes a light supply process of causing light from a light source to enter a surface layer provided with a compressive stress layer of the strengthened glass through a liquid provided with a refractive index equivalent to a refractive index of a surface of the surface layer or a refractive index that is between a refractive index of a surface of the surface layer and a refractive index of a part of the strengthened glass deeper than the surface layer; a light output process of causing the light that propagates in the surface layer to be emitted toward outside the strengthened glass through the liquid and a light input/output component; a light conversion process of converting two types of light components included in the light emitted toward outside the strengthened glass into two types of emission line sequences, wherein the two types of light components respectively oscillate parallel to and perpendicular to a boundary surface between the strengthened glass and the liquid; an imaging process of capturing an image of the two types of emission line sequences; a position measuring process of measuring positions of respective emission lines of the two types of emission line sequences from the image obtained by the imaging process; and a refractive index distribution calculation process of calculating, based on a result of the measurement of the position measuring process, refractive indexes of a surface of the strengthened glass corresponding to the two types of light components, or refractive index distributions of the strengthened glass in a depth direction from the surface corresponding to the two types of light components.

According to the disclosed technique, there can be provided a surface refractive index measurement method by which a refractive index distribution in a surface layer of a strengthened glass can be accurately measured in a non-destructive manner, even if an optical flatness on the surface of the strengthened glass is low or even if uniformity of the refractive index on the surface of the strengthened glass is low.

Other objects, features and advantages of the present invention will become more apparent from the following detailed description when read in conjunction with the accompanying drawings.

BRIEF DESCRIPTION OF THE DRAWINGS

FIG. 20 is a diagram (version 2) illustrating selection of the liquid.

DESCRIPTION OF THE PREFERRED EMBODIMENTS

Figure 1:
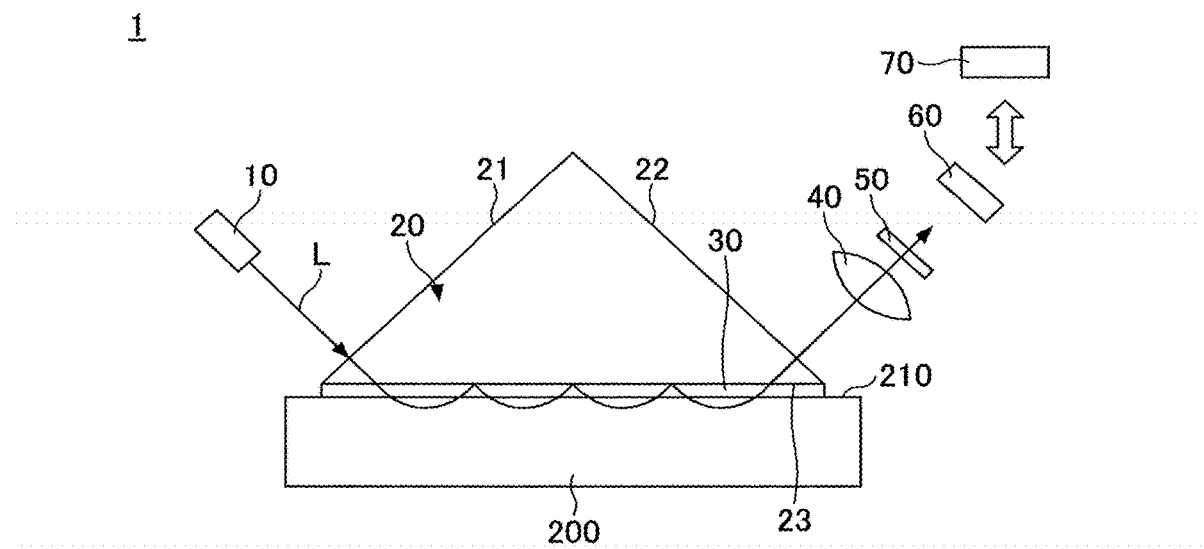
FIG. 1 is a diagram exemplifying a surface refractive index measurement device according to a first embodiment.

In the following, an embodiment for implementing the present invention is described by referring to the drawings. In the drawings, the same reference numerals are attached to the same components, and duplicate description may be omitted.

First Embodiment

FIG. 1 is a diagram exemplifying a surface refractive index measurement device according to a first embodiment. As illustrated in FIG. 1, the surface refractive index measurement device 1 is provided with a light source 10; a light input/output component 20; a liquid 30; a light converting component 40; a polarizing component 50; an image sensor 60; and an operation unit 70.

A strengthened glass to be measured is indicated by 200. The strengthened glass 200 is a glass to which a strengthening process is applied, for example, by a chemically strengthening method or a thermally strengthening method, etc., and the strengthened glass 200 includes a surface layer provided with a refractive index distribution on the side of a surface 210. The surface layer includes a compressive stress layer in which compressive stress is generated by ion exchange, and the surface layer may include a tensile stress layer in which tensile stress is generated. The compressive stress layer exists at least at a surface side of the glass. The tensile stress layer may exist at an inner side of the glass while being adjacent to the compressive stress layer.

The light source 10 is arranged so that a light beam L enters the surface layer of the strengthened glass 200 from the light input/output component 20 through the liquid 30. In order to utilize interference, it is preferable that the wavelength of the light source 10 be a single wavelength, which causes a simple contrast display.

As the light source 10, for example, a Na lamp may be used, from which light with a single wavelength can be easily obtained. In this case, the wavelength is 589.3 nm. Alternatively, as the light source 10, a mercury lamp may be used, in which the wavelength is shorter than that of the Na lamp. In this case, the wavelength is, for example, 365 nm, which is the mercury I-line. However, the mercury lamp provides many emission lines, so that it is preferable to use the mercury lamp through a bandpass filter that transmits only the 365 nm line.

Alternatively, a light emitting diode (LED) may be used as the light source 10. In recent years, LEDs with many wavelengths have been developed. A half-value width of a spectral width of the LED is greater than or equal to 10 nm. A single wavelength property is not good, and the wavelength varies depending on temperature. Accordingly, it is preferable to use it through a bandpass filter.

It is preferable to configure the light source 10 so that the LED is used through the bandpass filter because any wavelength from the ultraviolet region to the infrared region can be used, though the single wavelength property is not sufficient compared to those of Na lamp and the mercury lamp. Note that a light source with a wavelength other than the above-exemplified wavelengths may be used because the wavelength of the light source 10 does not affect the basic principle of measurement by the surface refractive index measurement device 1.

The light input/output component 20 is placed on the surface 210 of the strengthened glass 200 which is the object to be measured. The light input/output component 20 is provided with a function for causing light to enter the surface layer of the strengthened glass 200 from a side of a slope 21 and a function for causing the light that propagates inside the surface layer of the strengthened glass 200 to be emitted from a side of a slope 22 toward outside the strengthened glass 200.

A liquid 30, which is an optical coupling liquid for optically coupling a bottom surface 23 (a first surface) of the light input/output component 20 and the surface 210 of the strengthened glass 200, is filled between the light input/output component 20 and the strengthened glass 200. Namely, the bottom surface 23 of the light input/output component 20 abuts the surface 210 of the strengthened glass 200 through the liquid 30.

The refractive index of the liquid 30 is adjusted to be equivalent to the refractive index of the outermost surface of the surface layer of the strengthened glass 200. Here, "equivalent" means the relation between the refractive index of the liquid 30 and the refractive index of the surface layer of the strengthened glass 200 that allows a boundary surface between the bottom surface 23 of the light input/output component 20 and the liquid 30 to be one reflection surface of the guided light, without causing any reflection or refraction on a boundary surface between the surface of the strengthened glass 200 and the liquid 300.

Figure 19:
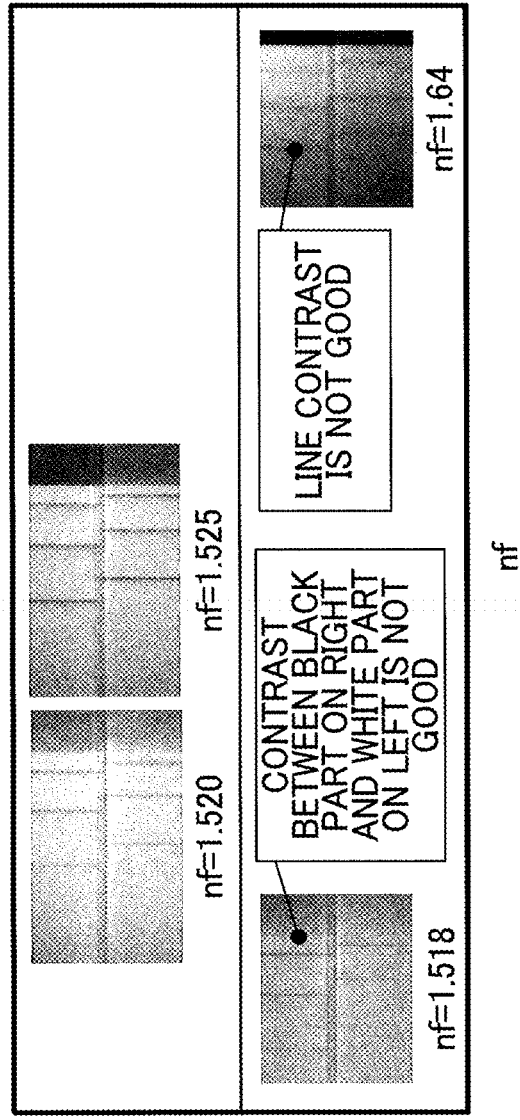
FIG. 19 is a diagram (version 1) illustrating selection of a liquid.

For example, as described in FIG. 19, when a strengthened glass obtained by diffusing tin (element symbol is Sn) in soda-lime glass is measured, if, in the strengthened glass 200, the refractive index of the glass prior to the strengthening process is ngb=1.518 and the refractive index of the outermost surface becomes ngs=1.525 by the chemically strengthening process, the contrast of the emission line is unfavorable and precise measurement is not possible when the refractive index nf of the liquid 30 is in the vicinity of the typical 1.64. Conversely, if nf is adjusted to be 1.518 which is the same as or less than the value of ngb, the contrast between the white part and the black part is deteriorated and precise measurement is not possible.

In contrast, for example, if nf=1.520 or 1.525, an emission line with high contrast can be observed and precise measurement can be performed. As described above, it is preferable that ngb<nf≤ngs+0.005, and it is more preferable that ngb+0.05 nf≤ngs+0.05. Additionally, it is particularly preferable that an absolute value of a difference between the refractive index nf of the liquid 30 and the refractive index ngs of the surface layer of the strengthened glass 200 be less than or equal to 0.005. A refractive index within this preferable range of the refractive index is referred to as an adequate refractive index of the present invention, and a refractive liquid with this refractive index is referred to as an adequate refractive liquid of the present invention.

Further, as described in FIG. 20, when a strengthened glass obtained by diffusing tin (element symbol is Sn) in soda-lime glass is measured, if it is measured by adjusting a thickness d of the liquid 30 to be 50 microns when the refractive index nf of the liquid 30 is in the vicinity of 1.64, the contrast of the emission line is unfavorable, and it is difficult to measure accurately. When the refractive index nf of the liquid 30 is adjusted to be equivalent to the refractive index ngs of the surface layer of the strengthened glass, and if the thickness d (microns) of the liquid 30 is made thinner, interference of a mode that is different from a mode for the measurement is observed and measurement is not possible at d=10 microns; however, at d=0.7 microns or 0.3 microns, an interference mode for measurement occurs. As described above, the thickness d of the liquid 30 is preferably less than or equal to 5 microns; more preferably less than or equal to 3 microns; more preferably less than or equal to 1 micron, and particularly preferably less than or equal to 0.7 microns. This range of the preferable thickness d of the liquid 30 is referred to as an adequate thickness.

As the liquid 30, for example, by mixing 1-bromonaphthalene (n=1.660) and liquid paraffin (n=1.48) in a suitable ratio, a liquid with a refractive index from 1.48 to 1.66 can be obtained. The refractive index of the mixed liquid approximately linearly varies with respect to the mixing ratio. A liquid with high refractive index accuracy can be obtained, for example, by measuring the refractive index of the liquid by Abbe's refractometer DR-A1 (measuring accuracy 0.0001) manufactured by Atago Co., Ltd., etc., and by adjusting the mixing ratio.

As the light input/output component 20, for example, a prism made of an optical glass can be used. In this case, it is required to adjust the refractive index of the prism to be greater than the refractive indexes of the liquid 30 and the strengthened glass 200 so that a light beam optically enters and exists on the surface 210 of the strengthened glass 200 through the prism. Additionally, it is required to select a refractive index so that incident light perpendicular thereto passes through a slope 21 of the prism and emitted light perpendicular thereto passes through a slope 22 of the prism.

For example, if a tilt angle of the prism is 60° and the refraction index of the surface layer of the strengthened glass 200 is 1.52, the refractive index of the prism may be adjusted to be 1.72. Further, the optical glass that can be a material of the prism has high refractive index uniformity and an in-plane deviation of the refractive index is suppressed to be, for example, less than or equal to $1 \times 10^{-5}$.

Note that, as the light input/output component 20, instead of the prism, another component provided with a similar function may be used. It is desirable that the in-plane deviation of the refractive index of the bottom surface 23 of the light input/output component 20 in an image region obtained at an image capturing process described below is suppressed to be less than or equal to $1 \times 10^{-5}$, regardless of the component used as the light input/output component 20. Additionally, the flatness of the bottom surface 23 of the light input/output component 20 is preferably formed to be less than or equal to $\lambda/4$, where $\lambda$ is the wavelength of the light from the light source 10, and it is more preferable that it is formed to be less than or equal to $\lambda/8$.

The image sensor 60 is arranged in the direction of the light emitted from the side of the slope 22 of the light input/output component 20, and the light converting component 40 and the polarizing component 50 are inserted between the light input/output component 20 and the image sensor 60.

The light converting component 40 is provided with a function for converting a light beam emitted from the side of the slope 22 of the light input/output component 20 into an emission line sequence to be condensed on the image sensor 60. As the light converting component 40, for example, a convex lens may be used. However, another component provided with a similar function may be used.

The polarizing component 50 is a light separating means provided with a function for selectively transmitting one of two types of light components that oscillate parallel to and perpendicular to the boundary surface between the strengthened glass 200 and the liquid 30, respectively. As the polarizing component 50, for example, a polarizing plate arranged in a rotatable state, etc., may be used. However, another component provided with a similar function may be used. Here, the light component oscillating parallel to the boundary surface between the strengthened glass 200 and the liquid 30 is S polarized light, and the light component that perpendicularly oscillates is P polarized light.

Note that the boundary surface between the strengthened glass 200 and the liquid 30 is perpendicular to the emission surface of the light emitted outside the strengthened glass 200 through the light input/output component 20. In other words, it can be said that the light component that oscillates perpendicular to the emission surface of the light emitted outside the strengthened glass 200 through the light input/output component 20 is the S polarized light and the light component that parallelly oscillates is the P polarized light.

The image sensor 60 is provided with a function for converting the light emitted from the light input/output component 20 and received via the light converting component 40 and the polarizing component 50 into an electric signal. More specifically, for example, the image sensor 60 can convert the received light into an electric signal and output, as image data, brightness values of respective pixels forming an image to the operation unit 70. As the image sensor 60, for example, an element, such as a charge coupled device (CCD) or a complementary metal oxide semiconductor (CMOS), may be used. However, another element provided with a similar function may be used.

The operation unit 70 is provided with a function for capturing image data from the image sensor 60 and for performing image processing and numerical computation. The operation unit 70 may be formed to include another function (for example, a function for controlling a light amount and exposure time of the light source 10, etc.). The operation unit 70 may be formed to include, for example, a central processing unit (CPU), a read-only memory (ROMC), a random access memory (RAM), a main memory, etc.

In this case, various functions of the operation unit 70 can be implemented by reading one or more programs stored in the ROM, etc., into the main memory and by executing it by the CPU. The CPU of the operation unit 70 can read data from and store data in the RAM depending on necessity. However, a part of the operation unit 70 or the whole operation unit 70 may be implemented only by hardware. The operation unit 70 may be physically formed of a plurality of devices, etc. As the operation unit 70, for example, a personal computer may be used.

In the surface refractive index measurement device 1, light L that enters the side of the slope 21 of the light input/output component 20 from the light source 10 enters the surface layer of the strengthened glass 20 through the liquid 30, and the light L becomes guided light that propagates in the surface layer. Then, as the guided light propagates in the surface layer, modes are generated by the optical waveguiding effect. The guided light travels along several determined paths, and the guided light is emitted outside the strengthened glass 200 from the side of the slope 22 of the light input/output component 20.

Then, by the light converting component 40 and the polarizing component 50, for each mode, images of emission lines of the P polarized light and the S polarized light are formed on the image sensor 60. The image data of the emission lines of the P polarized light and the S polarized light corresponding to the number of modes that are generated on the image sensor 60 is sent to the operation unit 70. The operation unit 70 calculates the positions of the emission lines of the P polarized light and the S polarized light on the image sensor 60 from the image data sent from the image sensor 60.

By such a configuration, the surface refractive index measurement device 1 can calculate a refractive index distribution for each of the P polarized light and the S polarized light in the surface layer of the strengthened glass 200 in the depth direction from the surface, based on the positions of the emission lines of the P polarized light and the S polarized light.

As a result, a stress distribution in the surface layer of the strengthened glass 200 in the depth direction from the surface can be calculated, based on a difference between the calculated refractive index distribution of the P polarized light and the calculated refractive index distribution of the S polarized light, and a photoelastic constant of the strengthened glass 200.

Additionally, in the surface refractive index measurement device 1, the liquid 30 that is an optical coupling liquid is filled between the light input/output component 20 and the strengthened glass 200, and the refractive index of the liquid 30 is adjusted to be equivalent to the refractive index of the surface layer of the strengthened glass 200. Additionally, a distance d (the thickness of the liquid 30) between the bottom surface 23 of the light input/output component 20 and the surface 210 of the strengthened glass 200, which face each other, is less than or equal to 5 microns. Additionally, the in-plane deviation of the refractive index of the bottom surface 23 of the light input/output component 20 is suppressed to be less than or equal to $1\times10^{-5}$, and the flatness of the bottom surface 23 is adjusted to be approximately less than or equal to ¼ of the wavelength $\lambda$ of the light from the light source 10. Accordingly, it is optically very uniform, and an ideal reflection can be obtained.

As a result of the above, a boundary surface between the bottom surface 23 of the light input/output component 20 and the liquid 30 can be one reflection surface of the guided light, without causing any reflection or refraction on the boundary surface between the surface of the strengthened glass 200 and the liquid 300, and thereby strong guided light can be obtained. Namely, one of the reflections of the guided light occurring on the surface of the strengthened glass in a device according to related art can be changed to a reflection on the bottom surface 23 of the light input/output component 20 provided with an optically ideal surface, such that a strong guided light can be obtained.

As a result, even if the optical flatness of the surface of the strengthened glass is unfavorable, or even if the refractive index uniformity of the surface of the strengthened glass is unfavorable, strong guided light that does not depend on the state of the surface of the strengthened glass can be obtained and clear emission lines can be obtained. Accordingly, a refractive index distribution in a surface layer of a strengthened glass can be accurately measured in a non-destructive manner.

Note that, since the thickness of the liquid 30 is approximately equal to the wavelength of the light source 10 or smaller than the wavelength, the guided light that is generated by being reflected on the bottom surface 23 of the light input/output component 20 is almost the same as the guided light generated by being reflected on the surface of the strengthened glass according to related art. Accordingly, the emission lines appear at the similar positions as those of related art, and a refractive index on the surface of the strengthened glass or a refractive index in the surface layer can be calculated based on the positions of the emission lines. Further, it is possible to calculate highly accurate stress on the surface of the strengthened glass or in the surface layer of the strengthened glass from a difference between the refractive index of the P polarized light and the refractive index of the S polarized light, and the photoelastic constant of the strengthened glass.

In the following, measurement of the refractive index distribution and measurement, etc., of the stress distribution by the surface refractive index measurement device 1 are described in greater detail.

(Mode and Emission Line)

Figure 2:
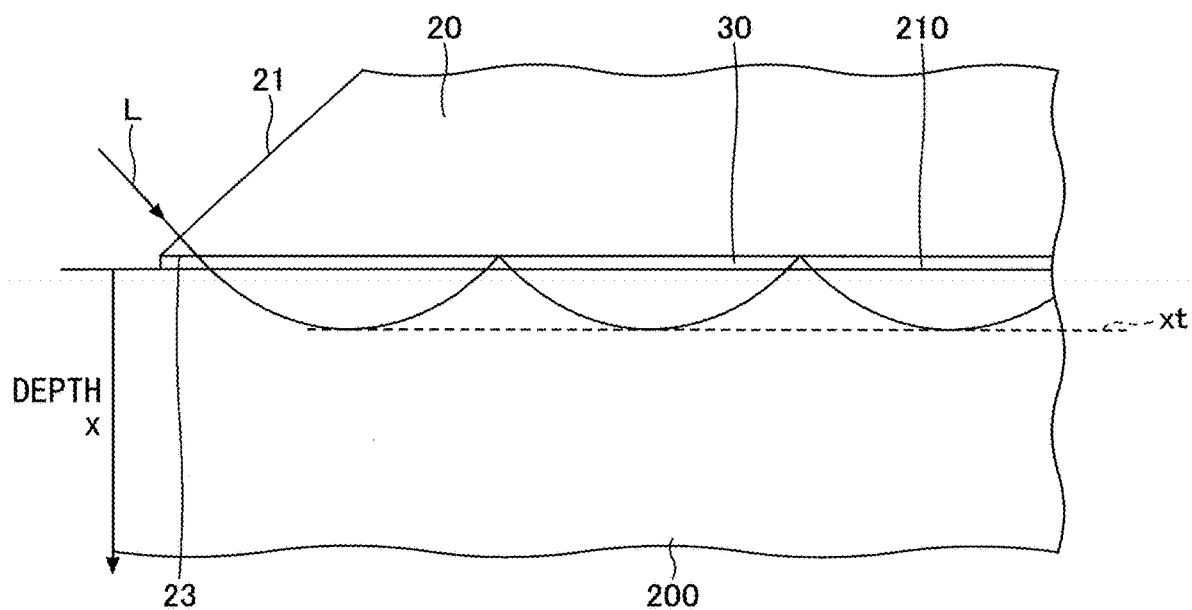
FIG. 2 is a diagram (version 1) representing a ray trace inside a glass.
Figure 3:
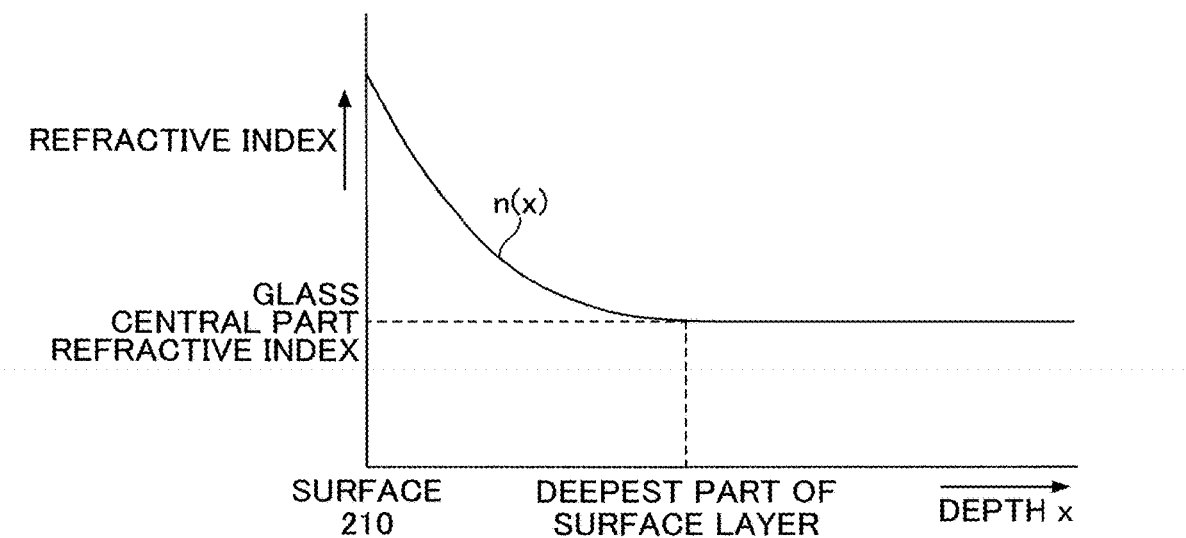
FIG. 3 is a diagram exemplifying a refractive index distribution on a surface layer of a strengthened glass.

By referring to FIG. 2 and FIG. 3, etc., a trace and a mode of a light beam, when the light beam enters the surface layer of the strengthened glass 200, are described.

In FIG. 2, the strengthened glass 200 is provided with a refractive index distribution in the depth direction from the surface 210. In FIG. 2, if the depth from the surface 210 is denoted by x and the refractive index distribution in the depth direction is denoted by n(x), the refractive index distribution n(x) in the depth direction becomes, for example, the curve shown in FIG. 3. Namely, in the strengthened glass 200, the refractive index is high at the surface 210 due to chemical strengthening. As the depth increases, the refractive index decreases. At the depth at which the chemically strengthened layer formed by chemical strengthening ends (the deepest part of the surface layer), the refractive index becomes the same as the refractive index of the original glass, and the refractive index becomes constant (the refractive index of the original glass) at a portion deeper than that. As described above, in the surface layer of the strengthened glass 200, the refractive index decreases as it moves inward.

At this time, compressive stress is generated at the side of the surface of the surface layer, and tensile stress acts inside the glass so as to be balanced with this compression. This equilibrium position is represented by a distance from the outermost layer as DOL_Zero value (Depth of Layer Zero value), and the depth at which the strengthened layer ends is represented by DOL_Tail (Depth of Layer_Tail value). Further, the tensile stress value inside the glass generated due to this balance is represented by CT value (Center Tension value).

In FIG. 2, the light beam L from the light source 10 enters the liquid 30 through the light input/output component 20, and reaches the boundary surface between the liquid 30 and the strengthened glass 200. The light travels toward inside the strengthened glass 200 without causing refraction and reflection because the refractive index of the liquid 30 and the refractive index of the surface 210 of the strengthened glass 200 are equivalent.

A ray trace of the light beam L that enters the surface 210 at a shallow angle (in the example of FIG. 2, it enters through the light input/output component 20 with the refractive index that is greater than that of the strengthened glass 200) gradually becomes parallel to the surface 210 because the refractive index decreases as it travels in the direction toward the inner part of the strengthened glass 200. At the deepest point xt, the direction reverses from the depth direction to the direction toward the surface 210.

Then, the light beam whose ray trace is reversed travels toward the surface 210 in a shape similar to the shape of the ray trace from the point of the entrance to the point of the reversal, and reaches the boundary surface between the liquid 30 and the strengthened glass 200. Since the refractive index of the liquid 30 and the refractive index of the surface of the strengthened glass 200 are equivalent, the light travels toward the liquid 30 without causing refraction and reflection, and reaches the boundary surface between the bottom surface 23 of the light input/output component 20 and the liquid 30. Since the refractive index of the light input/output component 20 is greater than the refractive index of the liquid 30, at least a part is reflected and travels toward the inner part of the strengthened glass 200 again, through the liquid 30.

The light traveling toward the inner part of the strengthened glass 200 reverses at the deepest point xt of the surface layer of the strengthened glass 200, and reaches the surface of the strengthened glass 200 and further reaches the boundary surface between the liquid 30 and the light input/output component 20 again. A part of the light is reflected again, and this is repeated. The light beam is transmitted as guided light between the bottom surface 23 of the light input/output component 20 and the deepest point xt of the surface layer of the strengthened glass 200.

Then, the guided light that is transmitted between the bottom surface 23 of the light input/output component 20 and the deepest point xt of the surface layer of the strengthened glass 200 is output to the outside of the strengthened glass 200 from the side of the slope 22 of the light input/output component 20.

As described above, the light beam that travels inside the strengthened glass 200 passes through a trace that has the same shape as the shape of the previous ray trace, and reverses at the depth xt and returns to the boundary surface between the bottom surface 23 of the light input/output component 20 and the liquid 30. This is repeated, and the light beam travels while traveling back and forth between the bottom surface 23 and the deepest point xt. Since the light travels in a limited space from the bottom surface 23 to the deepest point xt, the light can propagate only as a finite number of discrete modes.

Namely, only light beams through a plurality of predetermined paths can travel in the surface layer of the strengthened glass 200. This phenomenon is called an optical waveguiding effect, and it is the principle by which a light beam travels in an optical fiber. The mode of the light transmitted through the surface 210 by the optical waveguiding effect and the ray trace of the mode are determined by the refractive index distribution in the depth direction from the surface 210.

Here, even if the flatness of the surface 210 of the strengthened glass 200 is unfavorable, or even if the uniformity of the refractive index of the surface 210 of the strengthened glass 200 is unfavorable, reflection does not occur on the surface 210 of the strengthened glass 200 and reflection occurs on the boundary surface between the bottom surface 23 of the input/output component 20, in which the refractive index is uniform and which is formed to have favorable flatness, and the liquid 30.

Accordingly, the effect of multi-beam interference is high, and generation of the modes of the guided light becomes very clear.

Figure 4:
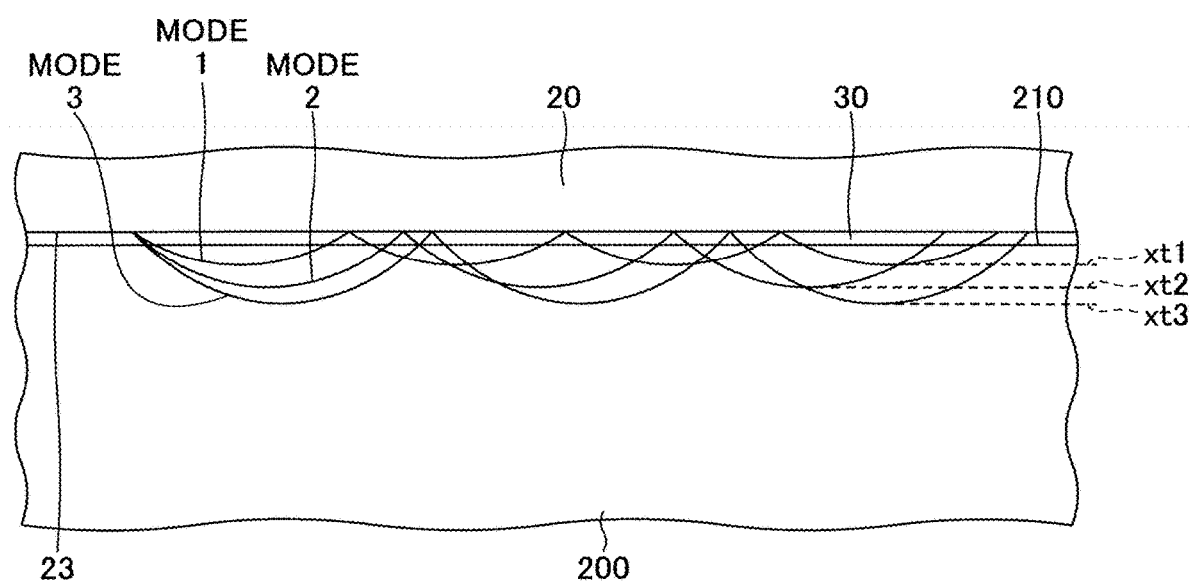
FIG. 4 is a diagram illustrating ray traces of respective modes when there is a plurality of modes.

FIG. 4 is a diagram illustrating ray traces of respective modes when the plurality of modes exists. In the example of FIG. 4, three modes, which are mode 1, mode 2, and mode 3 are illustrated. However, there may be a higher order mode. For the mode 1 that has the lowest order, an angle formed between the ray trace and the bottom surface 23 is the shallowest (the emission complementary angle is the smallest) when the ray trace is reflected on the bottom surface 23 of the light input/output component 20. Additionally, the deepest point of the ray trace differs for each mode, and the deepest point xt1 of mode 1 is the shallowest.

As the order of the mode increases, the angle formed with the bottom surface 23 at the time of reflection on the bottom surface 23 increases (the emission complementary angle increases). Further, the deepest point xt2 of mode 2 is deeper than the deepest point xt1 of mode 1, and the deepest point xt3 of mode 3 is further deeper than the deepest point xt2 of mode 2.

Here, an incident angle of a light beam with respect to a predetermined plane is an angle formed between the incident light beam and a normal to the predetermined plane. In contrast, an incident complementary angle of a light beam with respect to a predetermined plane is an angle formed between the incident light beam and the predetermined plane. Namely, if an incident angle of a light beam with respect to a predetermined plane is $\theta$, the incident complementary angle of the light beam with respect to the predetermined plane is $\pi/2-\theta$. The same applies to relation between an emission angle and an emission complementary angle of a light beam with respect to a predetermined plane.

In FIG. 4, incident light is represented by one light beam. However, the incident light has a certain spread. Even if the light has the spread, for each same mode, a complementary angle of the light emitted from the surface 210 is the same. Since light beams other than that of the generated mode cancel each other, light other than the light corresponding to each mode is not emitted from the surface 210. The same applies to FIG. 6, etc., described below.

Figure 5:
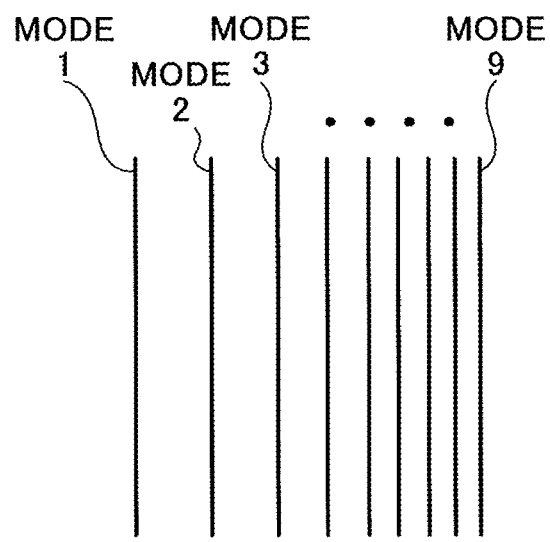
FIG. 5 is a diagram exemplifying an emission line sequence corresponding to the plurality of modes.

Emitted light from the slope 22 of the light input/output component 20 is condensed by the light converting component 40, and, as shown in FIG. 5, images of the light beams corresponding to the respective modes are formed as an emission line sequence in the depth direction on the image sensor 60, which is the focal plane of the light converting component 40. The reason that the image of the emission line sequence is formed is described by referring to FIG. 6.

Figure 6:
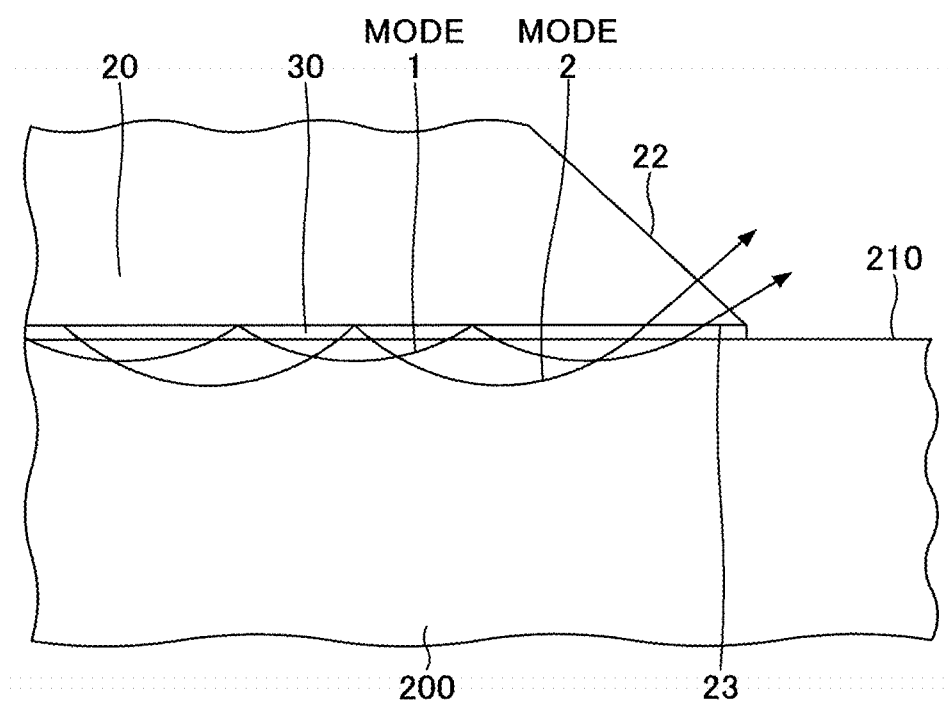
FIG. 6 is a diagram (version 2) representing ray traces inside the glass.

FIG. 6 is a diagram enlarging the side of the slope 22 (the right part) of the light input/output component 20 of FIG. 1. In FIG. 6, if the refractive index distribution of the surface layer of the strengthened glass 200 and the wavelength of the incident light are determined, all modes by the optical waveguiding effect are determined. For each mode, the angle formed between the ray trace and the bottom surface 23 of the light input/output component 20 is determined. Here, for different modes, different respective angles are determined.

Then, as the order of the mode increases, the ray trace passes through a deeper part of the surface layer of the strengthened glass 200, and the angle formed with the bottom surface 23 increases in order. In accordance with this, for the output light of each mode, the angle formed with the bottom surface 23 when it is emitted from the surface 210 of the strengthened glass 200 differs for each mode, and the angle increases in ascending order of the mode.

Further, in FIG. 1 and FIG. 6, the light input/output component 20 and the strengthened glass 200 have the same respective shapes, in the depth direction. As a result, for the light condensed by the light converting component 40, the image of the light corresponding to the mode is formed, as an emission line in the depth direction, on the image sensor 60, which is the focal plane of the light converting component 40.

Since the emission complementary angle differs for each mode, as illustrated in FIG. 5, the emission lines are arranged in order for respective modes, and the emission line sequence is obtained. Usually the emission line sequence is a sequence of bright lines. However, direct light from the light source may act as reference light with respect to the emitted light, and a sequence of dark lines may be obtained. However, the positions of the respective lines are exactly the same regardless of whether the sequence of bright lines is obtained or the sequence of dark lines is obtained.

Namely, an emission line appears as a bright line or as a dark line, when a mode is established. Even if brightness of the emission line changes depending on brightness of the reference line, there is no influence on the calculation of the refractive index distribution and the stress distribution according to the embodiment. Accordingly, in the present application, it is represented as the emission line for convenience, regardless of whether it is the bright line or the dark line.

As described above, when the light beam L (for example, a single color light beam) from the light source 10 enters the surface 210 of the strengthened glass 200 from the side of the slope 21 (the left part) of the light input/output component 20 through the liquid 30, the light that enters the surface 210 of the strengthened glass 200 propagates in the right direction in the surface layer of the strengthened glass 200 while tracing ray traces of several modes in the surface layer of the strengthened glass 200 by the optical waveguiding effect.

When this transmitted light is output to the outside of the strengthened glass 200 through the liquid 30 at the side of the slope 22 (the right part) of the light input/output component 20 and condensed on the image sensor 60 by the light converting component 40, images of the plurality of emission lines or the plurality of dark lines corresponding to the respective modes are formed on the image sensor 60 by the number of the modes.

Here, when the light beam that propagates in the surface layer is refracted and output to the outside of the strengthened glass 200, the emission complementary angle is equal to that of the critical refracted light when a medium, with the refractive index of the strengthened glass 200 at the deepest point of the ray trace of the light beam in the surface layer, i.e., a refractive index that is equal to the effective refractive index nn, contacts the light input/output component 20. The deepest point in each mode can also be interpreted as a point at which the light beam of that mode is totally reflected.

Here, as for the relationship between a difference $\Delta n$ in effective refractive indexes nn and the distance $\Delta S$ between emission lines between certain modes, if the focal length of the light converting component 40 is f, the refractive index of the light input/output component 20 is np, and the refractive index of the strengthened glass 200 is ng, relationships are as per the following Formula 1 (Expression 1) and Formula 2 (Expression 2).

$$\Delta n = k_1 \cdot \Delta S \quad \text{[Expression 1]}$$

$$k_1 = \frac{1}{f}\sqrt{1 - \left(\frac{n_g}{n_p}\right)^2} \quad \text{[Expression 2]}$$

Accordingly, if a position of an effective refractive index at one specific point is found on the image sensor 60, from positions of the observed emission lines, the effective refractive indexes of the respective modes corresponding to the emission lines, namely, the refractive indexes at the deepest points of the respective ray traces in the surface layer of the strengthened glass 200 can be obtained.

(Ray Trace)

In the embodiment, the refractive index distribution is calculated using Formula 3 (Expression 3) described below. Formula 3 is derived by the inventors based on the technical information, etc., described in Non-Patent Document 1. In Non-Patent Document 1, the path along which light travels is approximated to a circular arc while assuming that the refractive index distribution varies linearly. In contrast, in the embodiment, in order to obtain a condition under which the modes are established in any refractive index distribution, an arbitrary distribution n(x) is assumed as the refractive index distribution.

In Formula 3, θ is an emission complementary angle of a light beam that linearly travels an infinitesimal distance dr, n0 is a refractive index on the surface of the strengthened glass, Θ is an emission complementary angle of a light beam that enters the enhanced glass, λ is a wavelength of the light beam that enters the strengthened glass, and N is an order of a mode (for example, N=1 for mode 1). Additionally, G1 is the point at which the light beam enters the strengthened glass, F2 is the deepest point (xt) at which the light beam is reversed, and G2 is the point at which the light beam reversed at F2 reaches the strengthened glass again, which are different for each mode. Note that the first term on the left side is a term related to the light propagating in the surface layer, and the second term on the left side is a term related to the light propagating through the surface 210.

$$\int_{G1F2G2} n(x)\cos\theta dr - 2d_{G1G2}n_0\cos\Theta = \lambda\left(N - \frac{1}{4}\right) \quad \text{[Expression 3]}$$

The whole refractive index distribution can be obtained by calculating, using Formula 3, the depth of the deepest point of each mode in ascending order of the order of the mode while assuming that the rate of change in the refractive index of the strengthened glass 200 is constant between the deepest points of the modes whose orders are adjacent to each other.

For example, in FIG. 5, suppose that the refractive indexes of the surface layer at the depths of the deepest parts xt1, xt2, xt3, . . . of the respective modes, namely, the effective refractive indexes are n1, n2, n3, . . . . Additionally, suppose that the rates of change in the refractive index between the bottom surface 23 of the light input/output component 20 and xt1, between xt1 and xt2, between xt2 and xt3, . . . are linear, and that the respective rates of change in the refractive index are α1, α2, α3, . . . .

Since the ray trace in a certain mode n passes through a part that is shallower than the deepest point xtn of the mode, if the refractive index distribution from the surface to xtn is defined, the ray trace in that mode is uniquely determined. If xt of each of all the modes is known, the refractive index distribution is uniquely determined. However, it is difficult to obtain the refractive index distribution directly at once from Formula 3, not only analytically, but also numerically.

Accordingly, first α1 and α2, and xt1 and xt2 are obtained using modes 1 and 2 that pass through the part closest to the surface 210. Then, for mode 3, xt1 and xt2 are known, and the only unknown parameter is xt3. Accordingly, xt3 can be easily obtained. Similarly, if xt4, xt5, . . . are obtained in the order of mode 4, mode 5, . . . , xtns at the deepest points for all the modes can be obtained. Then, the refractive index distribution from the surface 210 in the depth direction can be obtained.

Figure 7:
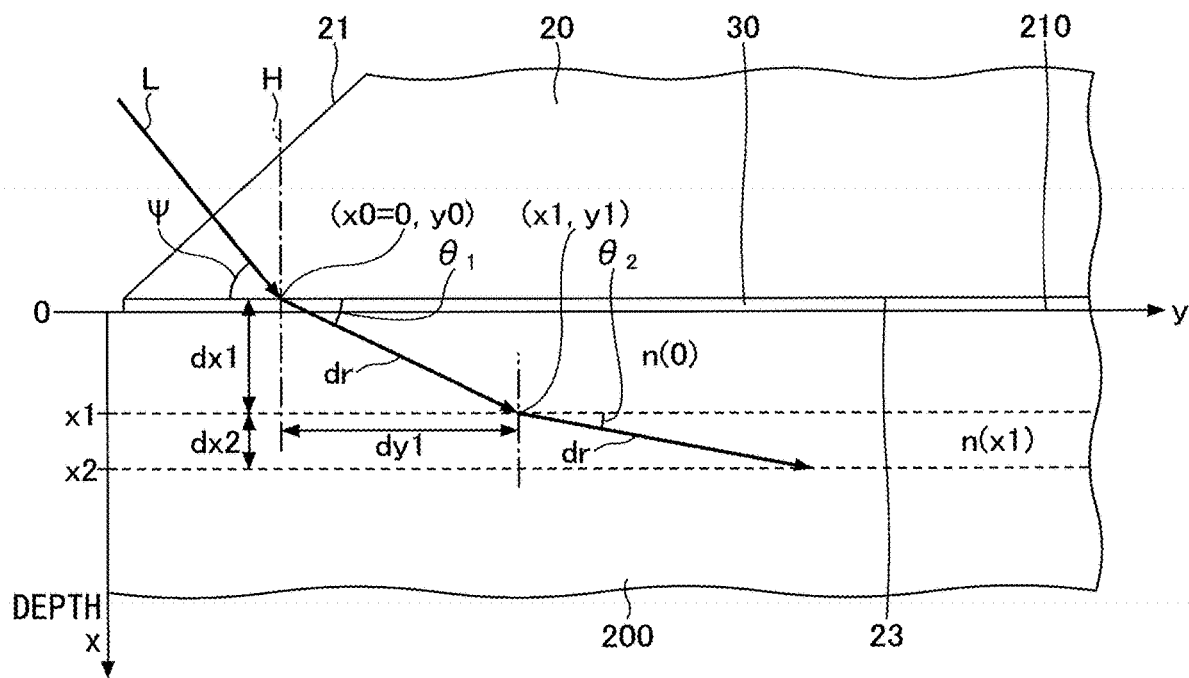
FIG. 7 is a diagram (version 3) representing a ray trace inside the glass.

FIG. 7 is a diagram representing the ray trace inside the glass. A specific method of calculating the refractive index distribution is described by referring to FIG. 7. First, using the ray tracing method, the left side of Formula 3 is obtained.

In FIG. 7, the x-direction (the vertical direction) is the depth direction of the strengthened glass 200, the y-direction (the lateral direction) is the direction horizontal to the surface 210 of the strengthened glass 200. Additionally, the refractive index at the depth x is n(x). Note that H is a normal to the surface 210.

Here, the light beam L that enters the surface 210 with an emission complementary angle V from the light input/output component 20 is considered, while assuming that the refractive index of the light input/output component 20 is 1.72. Additionally, suppose that the coordinates of the incident point is (x0, y0). Here, x0=0. At this time, the light beam L that enters inside the strengthened glass 200 travels while being refracted by an emission complementary angle θ1. At this time, Snell's equation holds between Ψ and θ1.

Next, while the trace of the light beam L in the strengthened glass 200 is a curve, suppose that the light beam L travels linearly in an infinitesimal distance dr (the distance dr is preferably approximately $\frac{1}{10}$ to $\frac{1}{100}$ of the wavelength). Namely, suppose that the light beam travels linearly by dr in the direction of the emission complementary angle θ1. At this time, a movement amount in the x-direction is dx1=dr·sin θ1, and a movement amount in the y-direction is dy1=dr·cos θ1. Further, the coordinates of the moved point are (x1, y1)=(dr·sin θ1, dr·cos θ1).

In this partial ray trace, the refractive index at the coordinates (x0=0, y0) of the start point is n(0) and the refractive index at the coordinates (x1, y1) of the end point is n(x1). However, it is assumed that within this ray trace, the refractive index does not vary from the refractive index at the starting point, and the refractive index changes to n(x1) at the end point. Then, the next ray trace advances while changing the angle to an emission complementary angle θ2 in accordance with Snell's law. The light traveling with the emission complementary angle θ2 linearly travels by dr, and further travels while changing the direction to an emission complementary angle θ3 (not depicted). This is repeated, and the whole ray trace is obtained by following the ray traces.

At this time, the first term on the left side of Formula 3 is calculated each time it travels by dr. For example, in the part from the coordinates (X0=0, y0) to the coordinates (x1, y1), the first term is dr·cos θ1·n(0) and it can be easily calculated. For another dr, it can be similarly calculated. Then, the total of the first term on the left side of Formula 3 can be obtained by adding the first terms obtained for respective "dr"s until the ray trace returns to the bottom surface 23 of the light input/output component 20. At this time, the distance Σdy traveled by this ray trace in the y-direction can be found. In Formula 3, since $d_{G1G2}$=Σdy and Θ=θ1, the second term on the left side of Formula 3 is obtained, and all the terms on the left side of Formula 3 are obtained.

Figure 8:
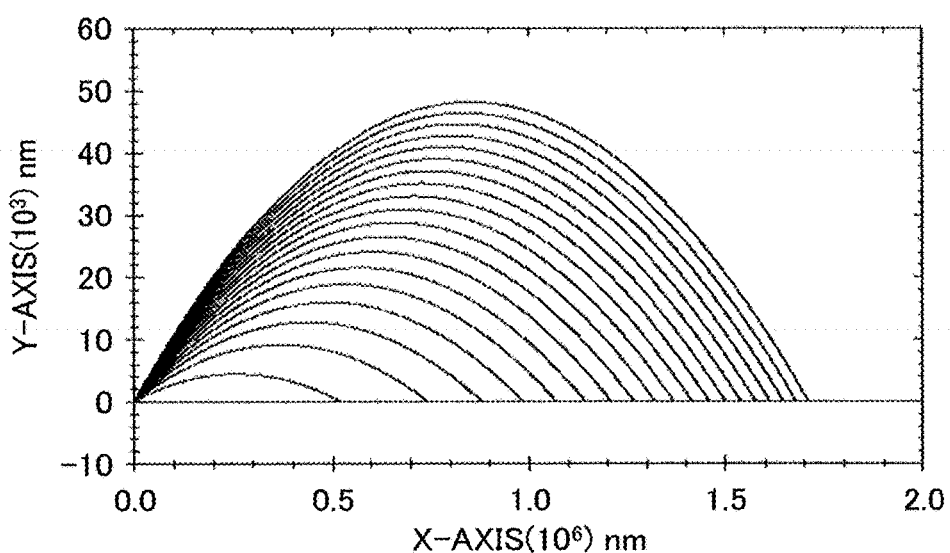
FIG. 8 is a diagram illustrating an example of calculation of the ray traces of respective modes of guided light that propagates through a surface layer of the strengthened glass.

FIG. 8 shows ray traces for respective modes of the guided light transmitted in the surface layer of a typical strengthened glass, which are calculated by the above-described method. In this typical strengthened glass, the refractive index of the original glass ngb=1.51, and the refractive index distribution on the surface modified by the chemically strengthening process is such that, the refractive index on the outermost surface ngs=1.52, the depth is 50 μm, and the distribution shape of the refractive index is a straight line. Further, the wavelength of the light source is 596 nm, the refractive index of the prism is np=1.72, and the refractive index of the liquid held between the prism and the strengthened glass is nf=1.64.

At this time, according to the calculation result, there are 19 modes, the angle θ1 formed between the lowest mode 1 and the surface of the glass, namely, Θ in Formula 3 is 2.0°, and the deepest point is 4.3 μm. Additionally, based on the ray trace of the mode 1, by calculating the reflectance R of the light energy on a boundary surface between the surface of the strengthened glass and the liquid by Fresnel's formulas, R=0.7 is obtained.

Figure 9:
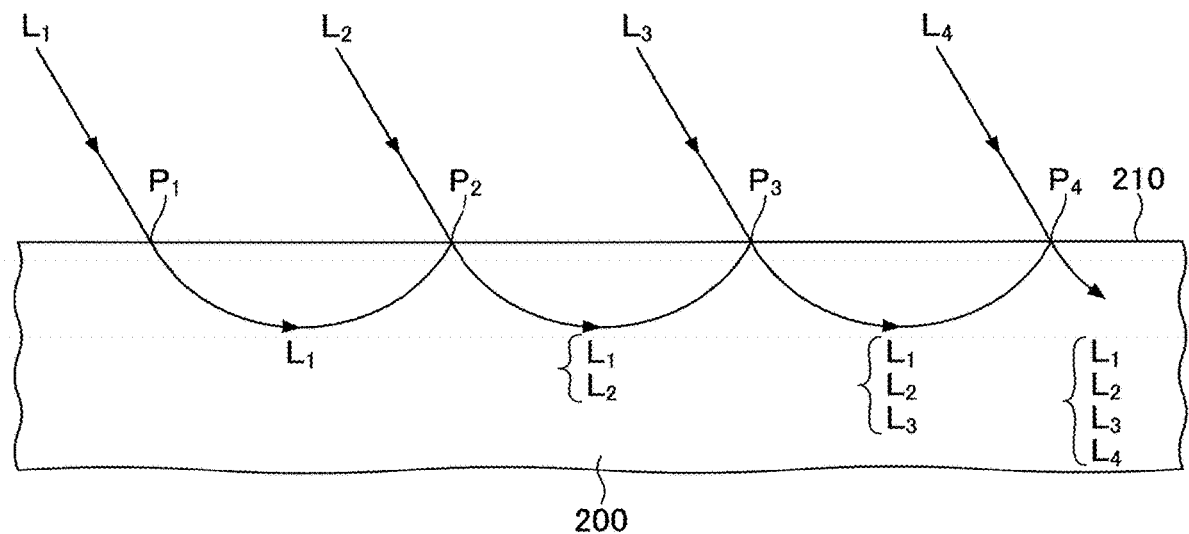
FIG. 9 is a diagram illustrating occurrence of multiple beam interference in an optical waveguiding effect.

The guided light in FIG. 1 is depicted by a single straight line. However, the optical waveguiding effect is of multiple beam interference. FIG. 9 is a diagram illustrating occurrence of the multiple beam interference in the optical waveguiding effect. In FIG. 9, the light beam $L_1$ from the light source enters the surface 210 of the strengthened glass 200 at point P1; the light beam $L_1$ that returns in the surface layer of the strengthened glass 200 reaches the point $P_2$; and interference is caused at the point $P_2$ with the light beam $L_2$ that enters from the same light source.

Then, the light beam $L_1$ reflected at point $P_2$ and the light beam $L_2$ that enters travel along the same path and reach the point $P_3$. At point $P_3$, again, the light beam $L_1$ and the light beam $L_2$ interfere with the light beam $L_3$ that enters from the same light source. Furthermore, the light beam $L_1$, the light beam $L_2$, and the light beam $L_3$ proceed to the point $P_4$ along the same path, and interference with more light beams is caused, thereby causing the multiple beam interference.

Generally, for the multiple beam interference, the interference condition becomes narrow. Accordingly, the guided light propagates in the surface layer of the enhanced glass under the very narrow condition. Namely, only the light that satisfies the very narrow condition on e in Formula 3 propagates in the surface layer of the strengthened glass as the guided light. As a result, the line width of the emission line is very narrow and sharp. This phenomenon is important for allowing accurate measurement of the position of the emission line.

However, in order for the width of the emission line to be narrow under the multiple beam interference, it is necessary for the glass surface, which is the interference surface, to be optically flat and uniform.

(Fabry-Perot Interference Formula)

Figure 10:
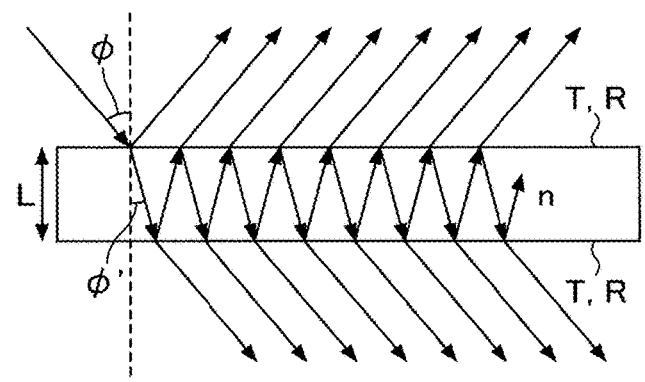
FIG. 10 is a diagram illustrating the multiple beam interference in a Fabry-Perot interferometer.

The multiple beam interference in the Fabry-Perot interferometer is briefly described. FIG. 10 is a diagram illustrating the multiple beam interference in the Fabry-Perot interferometer. As shown in FIG. 10, the light that enters a film with an angle φ is repeatedly reflected between two reflecting surfaces. Here, the film has a refractive index n and a thickness L, and the film includes the two reflecting surfaces, each of which has the reflectance R and the transmittance T, arranged in parallel in the vertical direction. Then, the multiple beam interference is caused and only the wavelength that causes interference passes through the two reflecting surfaces. Accordingly, only light with a wavelength in a narrow range is transmitted. Thus, this principle is used for a spectroscope or a narrow band interference filter. A finesse value F is defined as a measure of the wavelength range to be transmitted.

When an optical path length in a round trip between the two reflecting surfaces is an integral multiple of the wavelength of the incident light, the maximum brightness is obtained, and this can be the condition of interference. However, there are multiple wavelengths that satisfy this condition. A finesse value F is defined as a ratio of a width of wavelength of transmitted light to an interval between adjacent wavelengths that satisfy the interference condition. As shown in Formula 4, the finesse value is determined by the reflectivity R.

$$F = \frac{\pi\sqrt{R}}{1-R} \quad \text{[Expression 4]}$$

There is a selection rule on the incident angle for the Fabry-Perot interferometer (φ in FIG. 10), and the finesse value F is a parameter that has the same meaning for the incident angle. Further, as for the finesse value F, it is required that the flatness and parallelism of the reflecting surface are favorable. Even if the reflectivity R is large, if the flatness value and parallelism value of the reflecting surface are large, a sufficient finesse value F may not be obtained. For example, in a Fabry-Perot interferometer which is currently in practical use and commercially available, the finesse value F is large, which is approximately from 50 to 100. The flatness of the reflecting surface for achieving this is from $\lambda/200$ to $\lambda/100$.

In principle, the multiple beam interference of the guided light in the surface layer of the strengthened glass according to the embodiment is the same as that of the Fabry-Perot interferometer. For the Fabry-Perot interferometer, two reflecting surfaces with the reflectance R and the transmittance T are used. The surface refractive index measurement device 1 differs from the Fabry-Perot interferometer only in that the guided light is totally reflected at one side, and the principle of causing the multiple beam interference is the same. Though the finesse value F and the value of the relational expression of the required flatness of the reflecting surface are slightly different, the tendencies are the same. Accordingly, the width and sharpness of the emission line of the surface refractive index measurement device 1 are also related to the reflectance and transmittance of the surface of the strengthened glass, and the flatness of the surface.

For the surface refractive index measurement device 1, since it is totally reflected at one side and the reflectance is 100%, the finesse value F can be obtained by substituting the square root of the reflectance of the glass surface for the reflectance R of the finesse value F of the Fabry-Perot in Formula 4. Assuming that the flatness equals to $\lambda/q$, for the Fabry-Perot interferometer, since two reflecting surfaces are required for one round trip of the light beam, the minimum flatness required for obtaining the finesse value F is $q>2\times F$; and for the surface refractive index measurement device 1, since the reflecting surface is one surface, the minimum flatness required for obtaining the finesse value F is $q>F$.

As described above, for a typical strengthened glass, the reflectance R on the surface of the enhanced glass is approximately 0.7. For example, if R=0.7, the square root is 0.837 and the finesse value F is approximately 18. Accordingly, a sufficient finesse value F is obtained form the reflectance. However, the required flatness becomes $\lambda/18$, and very high flatness is required. However, for the surface refractive index measurement device 1, high resolution, such as that of spectroscope, is not required, and it suffices if the finesse value F can be obtained that is enough for obtaining the measurement accuracy of the position of the emission line.

Figure 11:
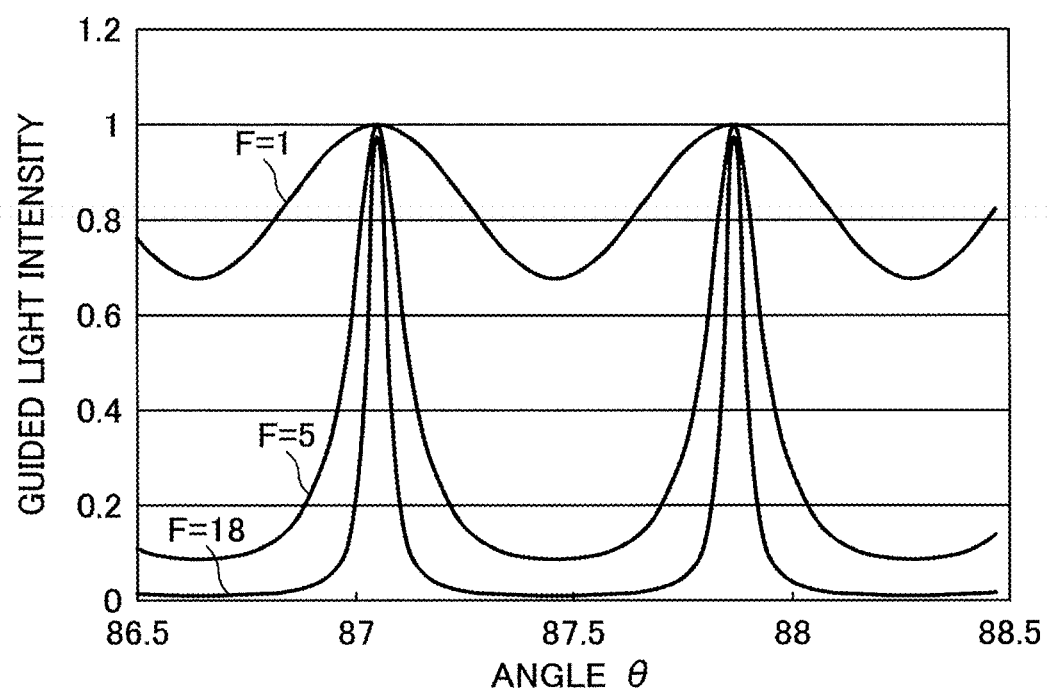
FIG. 11 is a diagram illustrating an example of calculation of a relation between guided light strength and an angle formed between the guided light and a surface of the strengthened glass.

FIG. 11 shows the results of calculating, for each finesse value, the relationship between the guided light intensity and the angle Θ formed between the guided light and the surface of the strengthened glass, in the example of the above-described typical strengthened glass.

In FIG. 11, the results of the respective finesse values F of 1, 5, and 18 are compared. At the finesse value F=18, which is obtained from the reflectance, the peak is very sharp. In contrast, when the finesse value F=1, the width is large, and the contrast is less than or equal to ⅕. It is expected that the emission line measurement accuracy is lowered.

However, even if the finesse value F is approximately 5, the contrast is reduced approximately 10%. The peak is sharp, and the shape allows sufficient emission line position measurement. Namely, if the finesse value F is approximately from 5 to 10, sufficient position measurement is allowed. At that time, the required flatness is from $\lambda/10$ to $\lambda/5$.

(Flatness of Glass)

A glass of an optical component, such as a lens, a prism, etc., used for an optical device, such as a camera, a microscope, and a telescope, is formed so as to maximize optical uniformity, such as uniformity of the refractive index and a surface property. Unevenness of a refractive index of a usual optical glass is less than $1\times10^{-5}$, and flatness of an optical component that emphasizes the flatness, such as a prism, is from ⅛ to ¼ of the wavelength $\lambda$ of usual incident light.

In contrast, a glass used for a display or a case main body of an electronic device, such as a cellular phone or a smartphone, is formed by a glass plate manufacturing method, such as a float method or a fusion method. In these manufacturing methods, the productivity is very high. However, the uniformity of the refractive index and the optical flatness of the surface are unfavorable. For these glasses, the mechanical strength is preferentially considered. However, shape flatness or unevenness of the refractive index of the glass surface are not considered further, if flatness, transparency, uniformity, etc., are visually obtained.

Accordingly, compared with the usual flatness of an optical component, which is from $\lambda/8$ to $\lambda/4$, the optical flatness of the glass used for a display or a case main body of an electronic device, such as a cellular phone or a smartphone, is significantly unfavorable.

Additionally, in the chemical strengthening process after the process of forming the glass, in a chemically strengthened glass formed by the chemical strengthening process in which the surface stress becomes strong in a short time, ion exchange may not be uniformly performed, and the refractive index may be locally non-uniform. For example, in a glass obtained by dispersing metal ions in a surface layer of a strengthened glass, the gradient of the refractive index rapidly increases in the surface layer. In this case, the metal ions are Sn, Ag, Ti, Ni, Co, Cu, In, etc.

Figure 12A:
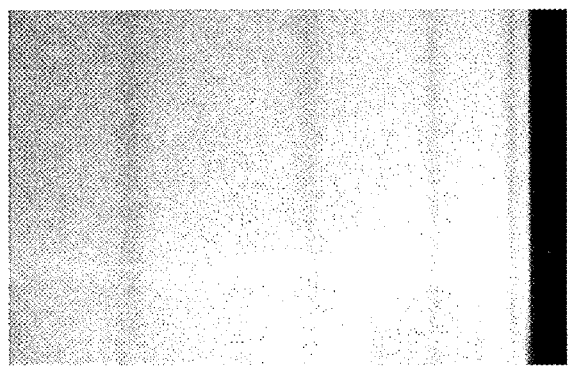
FIGS. 12A and 12B show examples of pictures of the emission line sequences when flatness of a surface of the strengthened glass is favorable and when the flatness of the surface of the strengthened glass is unfavorable.
Figure 12B:
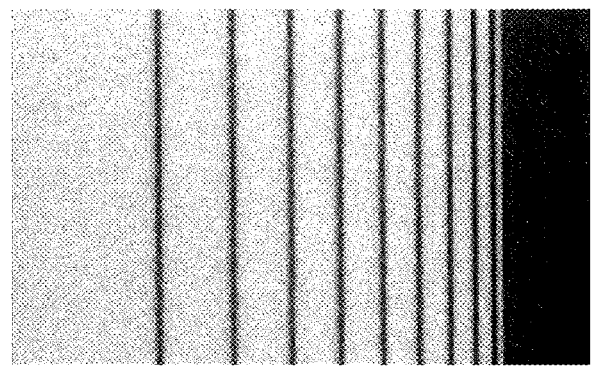

In such a glass with low optical flatness, the finesse value F due to multiple beam interference is deteriorated, the width of the emission line is large, the contrast is lowered, and highly accurate position measurement may be prevented. In an extreme case, substantially no mode occurs, and the measurement may be difficult. FIGS. 12A and 12B show photographs of the emission line sequence for cases in which the flatness of the surface of the strengthened glass is high and low. FIG. 12A is an example in which the flatness of the surface of the strengthened glass is low. FIG. 12B is an example in which the flatness of the surface of the strengthened glass is high.

As described above, in a chemically strengthened glass in which optical unevenness is large on a surface or in a vicinity of the surface, or in which optical flatness of the surface is low, an emission line whose image is formed on an image sensor has a large line width and the contrast is low. Accordingly, it becomes unclear, and the measurement accuracy of the emission line is lowered. If the unevenness is extremely large or the flatness is extremely low, the guided light itself disappears, and the emission line may not occur. Accordingly, in a device according to related art, the measurement accuracy of the surface refractive index of the strengthened glass or the refractive index distribution in the surface layer is lowered, and, moreover, the measurement may become difficult.

As described above, in the surface refractive index measurement device 1, the liquid 30 that is an optical coupling liquid is filled between the light input/output component 20 and the strengthened glass 20, and the refractive index of the liquid 30 is adjusted to be equivalent to the refractive index on the outermost surface of the surface layer of the strengthened glass 200 or that of a part deeper than the surface layer of the strengthened glass. Additionally, a distance d (the thickness of the liquid 30) between the bottom surface 23 of the light input/output component 20 and the surface 210 of the strengthened glass 200, which face each other, is less than or equal to 5 microns. Additionally, the in-plane deviation of the refractive index of the bottom surface 23 of the light input/output component 20 is suppressed to be less than or equal to $1 \times 10^{-5}$, and the flatness of the bottom surface 23 is less than or equal to ¼ of the wavelength λ of the light from the light source 10. Accordingly, it is optically very uniform, and an ideal reflection can be obtained.

Accordingly, even if the surface optical flatness of the strengthened glass is low or even if the surface refractive index uniformity of the strengthened glass is low, strong guided light that does not depend on the state of the surface of the strengthened glass can be obtained, and the refractive index distribution of the surface layer of the strengthened glass can be accurately measured in a non-destructive manner. For example, the surface refractive index measurement device 1 can accurately measure the refractive index distribution in the surface layer of the strengthened glass 200 with a surface roughness Ra of 0.005 microns, 0.01 microns, or 0.05 microns, which is difficult to measure with a device according to related art, in which the guided light is reflected on the surface of the strengthened glass. Furthermore, even if the strengthened glass 200 has surface roughness Ra of 0.1 microns or more, the refractive index distribution in the surface layer can be accurately measured.

(Calculation of the Refractive Index Distribution)

Next, a method of calculating the refractive index distribution is described. First, as indicated in Non-Patent Document 1, from the position of the emission line of mode 1 and the position of the emission line of mode 2, the refractive index of the surface 210 and the deepest point of the mode 2 are obtained. As a result, values of three points, which are the surface 210 (x=0), the deepest point of mode 1 (xt1), and the deepest point of mode 2 (xt2) can be found, and the refractive indexes n0, n1, and n2 at the respective points can be found. However, since the surface is obtained by extrapolation of mode 1 and mode 2, these points are on a straight line.

Next, by assuming that the deepest point xt3 in mode 3 is a suitable value, the refractive index distribution up to xt3 can be defined, and the left side of Formula 3 in this distribution can be calculated by the above-described calculation method. Namely, the left side of Formula 3 can be calculated while using xt3 as the only parameter, and the right side is determined by the order of the mode, which is 2.75λ for mode 3.

Subsequently, xt3 can be easily calculated using a calculation method of a non-linear equation, such as the Bisection method or Newton's method, while using xt3 as a parameter. Then, after calculating up to xt3, xt4 can be calculated from the emission line position of subsequent mode 4. By repeating the similar calculation for all the emission lines, the whole refractive index distribution can be calculated.

(Calculation of Stress Distribution)

Since the strengthened glass has strong compressive stress in the plane, the refractive index of the P polarized light and the refractive index of the S polarized light are shifted by the amount of the stress due to the photoelastic effect. Namely, when in-plane stress exists on the surface 210 of the strengthened glass 200, between the P polarized light and the S polarized light, the refractive index distribution differs, generation of the modes differs, and the positions of the emission lines differ.

Accordingly, if the positions of the emission lines in the P polarized light and the S polarized light are found, the refractive index distribution of the P polarized light and the refractive index distribution of the S polarized light can be calculated inversely. Then, the stress distribution σ(x) of the strengthened glass 200 in the depth direction from the surface 210 can be calculated, based on the difference between the refractive index distribution of the P polarized light and the refractive index distribution of the S polarized light and the photoelastic constant of the strengthened glass 200.

Specifically, the stress distribution can be calculated using Formula 5 (Expression 5) described below. In Formula 5, kc is the photoelastic constant, and $\Delta n^{PS}(x)$ is the difference between the refractive index distribution of the P polarized light and the refractive index distribution of the S polarized light. Since the refractive index distribution $n_P(x)$ of the P polarized light and the refractive index distribution $n_S(x)$ of the S polarized light are each obtained discretely, by linearly approximating a value between points or by calculating an approximate curve using multiple points, stress distribution can be obtained at any point.

$$\sigma(x) = \Delta n_{PS}(x)/kc \qquad \text{[Expression 5]}$$

Note that, in the stress distribution measured for the chemically strengthened glass, the stress value at the point at which the stress is 0 is DOL_Zero value, and the stress value at the calculated deepest point is the CT value.

However, since the CT value and the DOL_Zero value are obtained from an infinitesimal refractive index difference between the P polarized light and the S polarized light, especially at a portion where the variation in the refractive index is small (in the vicinity of the zero cross at which the gradient of the refractive index distribution is gentle), the difference in the refractive index between the P polarized light and the S polarized light becomes small and the measurement error increases. Accordingly, the CT value may be calculated using Formula 6 (Expression 6) so that the value obtained by integrating the calculated stress distribution of the compressive stress layer in the depth direction of the strengthened glass 200 is balanced with the tensile stress inside the strengthened glass 200. Here, CS(x) is a compressive stress value at the position x in the depth direction of the strengthened glass 200 shown in FIG. 7. In the following, for description distinguishing the CT value calculated based on Formula 0 from the CT value calculated based on Formula 5, these are referred to as $CT_0$ value and $CT_5$ value, respectively. For example, the range of integration may be defined to be from the surface 210 to the center of the strengthened glass 200, and the $CT_5$ value may be determined so that the result of the integration becomes zero. At that time, the depth at which the stress is zero point may be calculated as the DOL_Zero value.

$$CT = 2 \times \int_0^{DOL} CS(x)\,dx/(t \times 100 - 2 \times DOL) \qquad \text{[Expression 6]}$$

(Measurement Flow)

Figure 13B:
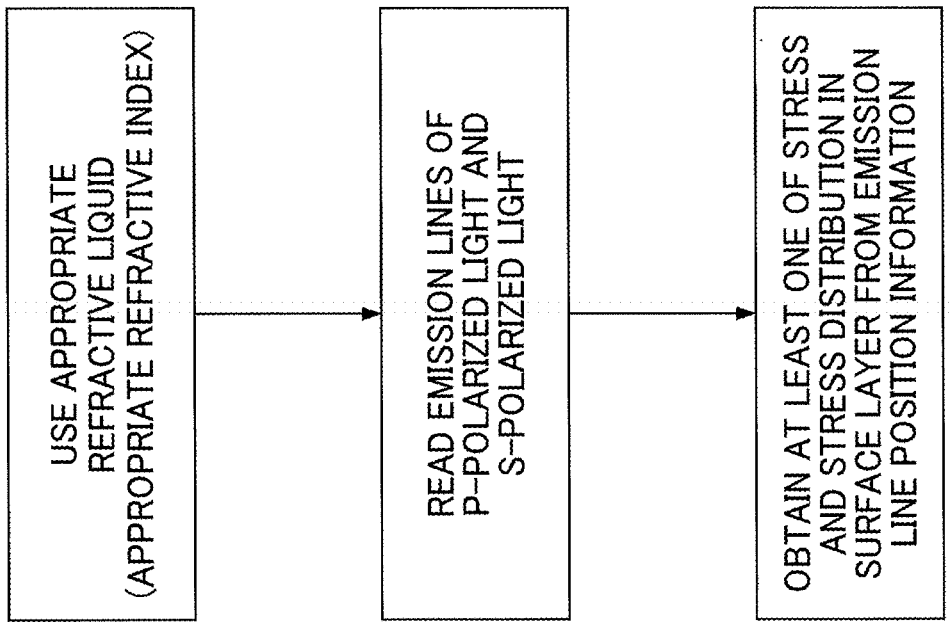
FIGS. 13A and 13B show flowcharts comparing a measurement method according to related art and a measurement method according to an embodiment.
Figure 13A:
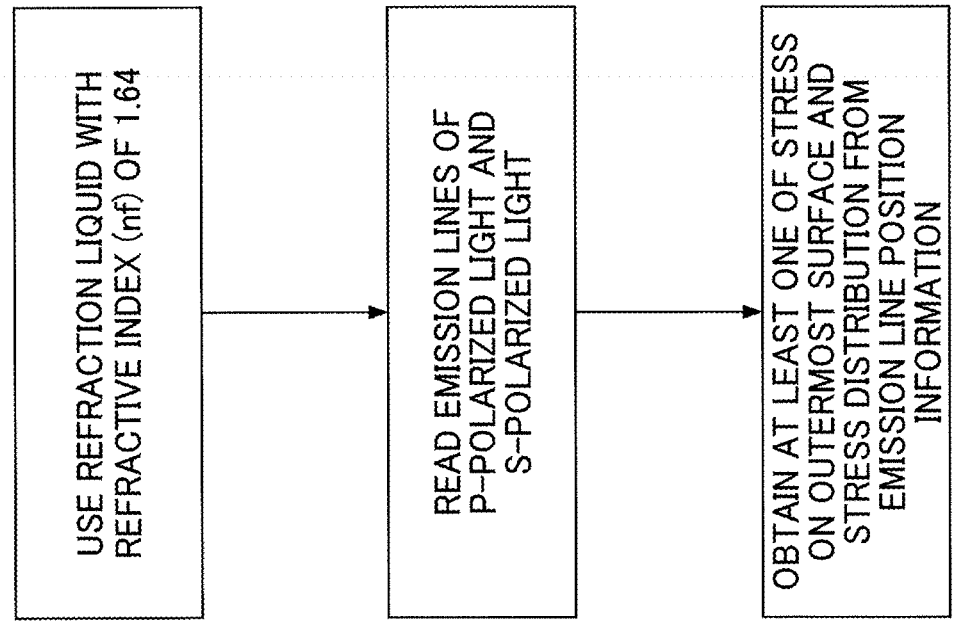
Figure 14:
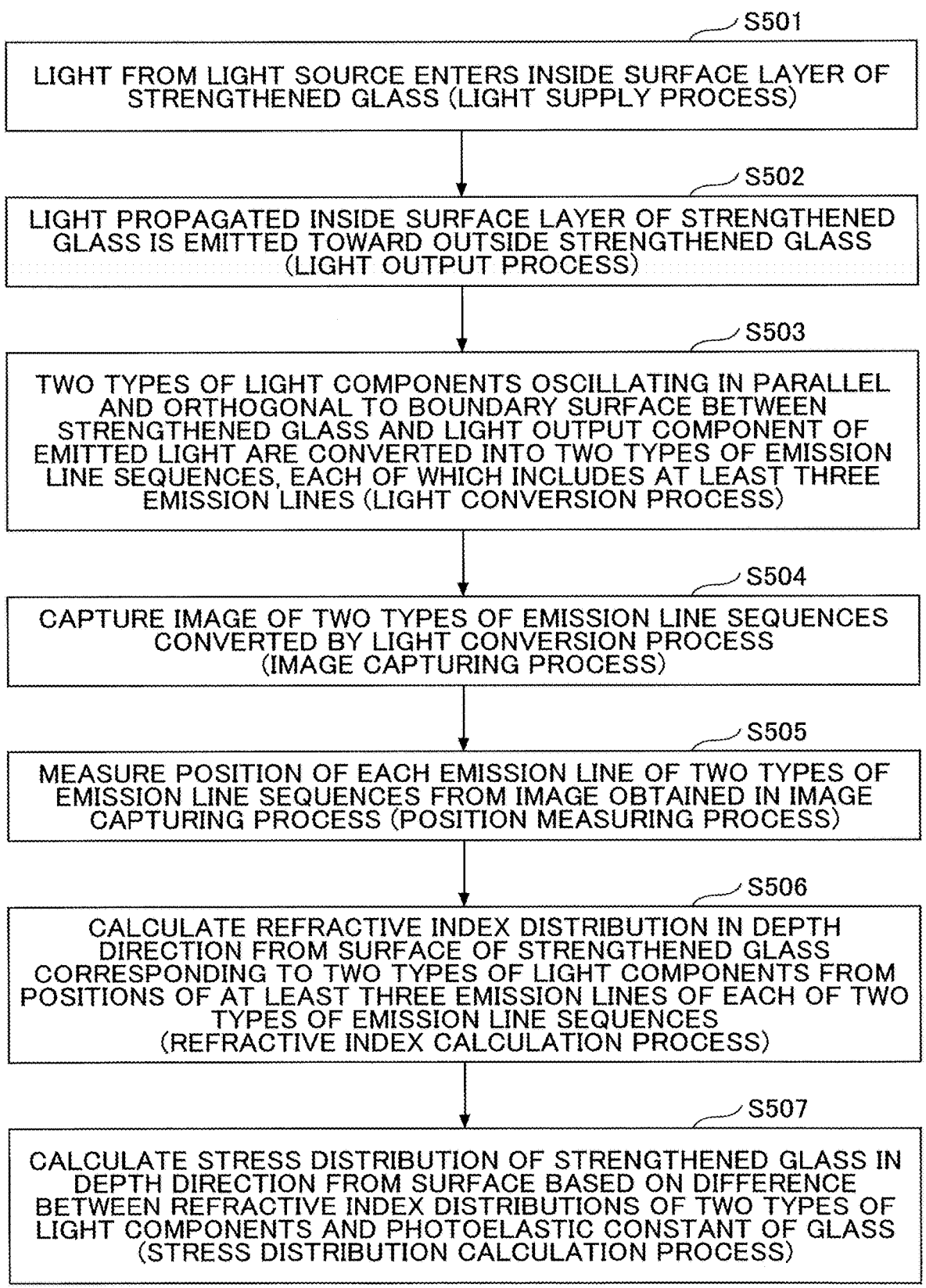
FIG. 14 is a flowchart exemplifying the measurement method according to the embodiment.

Next, the measurement flow is described by referring to FIG. 13 and FIG. 14. FIGS. 13A and 13B are diagrams comparing the measurement method (FIG. 13A) according to related art and the measurement method (FIG. 13B) according to the embodiment. As shown in FIG. 13A, usually, the refractive index of the refractive liquid is used as 1.64, emission lines of the P polarized light and the S polarized light are read, and at least one of the stress and the stress distribution of the surface is calculated from the read emission line position information.

In contrast, as shown in FIG. 13B, in the embodiment, an appropriate refractive liquid with an appropriate refractive index is used, the glass and the prism are contacted with an appropriate thickness, the emission lines of the P polarized light and the S polarized are read, and at least one of the stress or the stress distribution in the surface layer is obtained.

Additionally, by mixing a filler (powder) in the refractive liquid having an appropriate refractive index, it becomes difficult for the strengthened glass 200 and the prism to directly contact. Accordingly, the prism can be prevented from being damaged and the deterioration of the prism can be suppressed. It is preferable to use a filler (powder) having a particle diameter from 0.001 μm to 5 μm. In order to suppress scratches on the strengthened glass 200 and the prism, it is preferable that the material of the filler (powder) is a flexible resin or a material with an infinitesimal size with which scratches are not noticeable. As the filler (powder), polycarbonate, polyethylene, polystyrene, polypropylene, colloidal silica, etc., are preferably used.

Additionally, by preparing the refractive liquid by mixing two or more types of liquids with respective different materials, the viscosity of the refractive liquid can be adjusted. If the viscosity is low, it can be easily adhered to the glass and the prism. Thus, it is preferable that the viscosity is low. The viscosity is preferably less than or equal to 5 cps (centipoise), more preferably less than or equal to 3 cps, and further more preferably less than or equal to 1 cps.

Additionally, by preparing the refractive liquid by mixing two or more types of liquids with respective different materials, the boiling point can be adjusted. If the boiling point is high, the property of the refractive liquid is not easily changed during storage. Thus, it is preferable that the boiling point is high. The boiling point is preferably higher than or equal to 100° C., more preferably higher than or equal to 110° C., and further more preferably higher than or equal to 120° C.

As another method for avoiding scratches on the prism due to direct contact between the strengthened glass 200 and the prism, there is a method such that, on the contact plane between the strengthened glass 200 and the prism, the region at the prism side where light interferes is made 0.001 μm to 5 μm lower than the other region. The method is not particularly limited. However, there are a method in which a film is formed by sputtering, etc., on the part other than the region where light interferes, a method of etching only the region where light interferes, etc.

Figure 15:
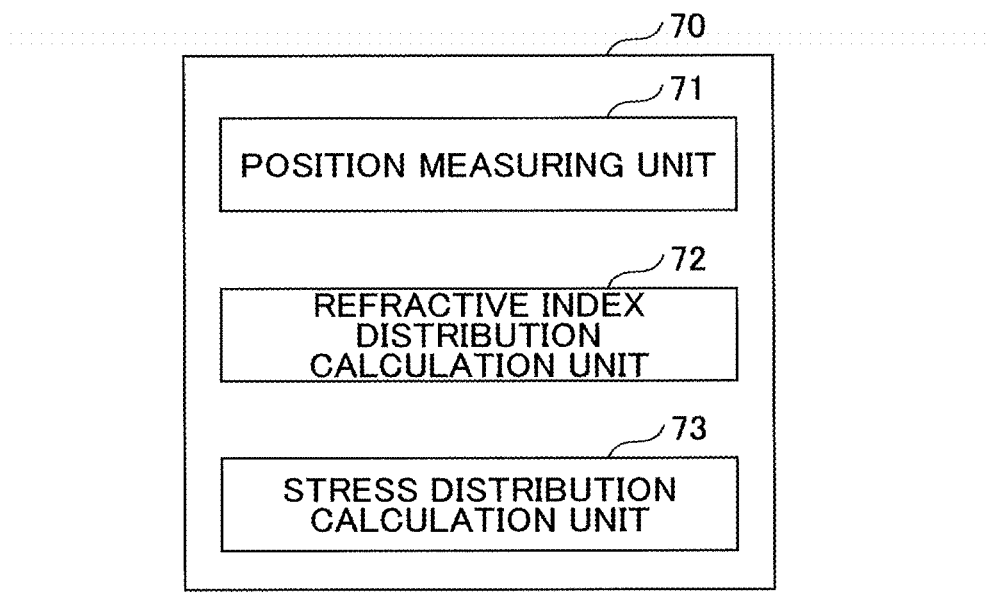
FIG. 15 is a diagram exemplifying functional blocks of an operation unit of a surface refractive index measurement device.

FIG. 14 is a flowchart exemplifying the measurement method according to the embodiment. FIG. 15 is a diagram exemplifying functional blocks of the operation unit 70 of the surface refractive index measurement device 1.

First, at step S501, light from the light source 10 is caused to enter inside the surface layer of the strengthened glass 200 (light supply process). Next, at step S502, the light propagated in the surface layer of the strengthened glass 200 is caused to be emitted outside the strengthened glass 200 (light output process).

Next, at step S503, the light converting component 40 and the polarizing component 60 convert two types of light components (the P polarized light and the S polarized light) of the emitted light that respectively oscillate parallel to and perpendicular to the emission surface into two types of emission line sequences, each of which includes three or more emission lines (light converting process).

Next, at step S504, the image sensor 60 captures images of the two types of emission line sequences, which are converted by the light converting process (image capturing process). Next, at step S505, a position measuring unit 71 of the operation unit 70 measures the position of each emission line of the two types of emission line sequences in the images obtained by the image capturing process (position measuring process).

Next, at step S506, a refractive index distribution calculation unit 72 of the operation unit 70 calculates the respective refractive index distributions, which correspond to the two types of light components, of the strengthened glass 200 in the depth direction from the surface 210, from the positions of the three or more emission lines of each of the two types of emission line sequences (refractive index distribution calculation process).

Next, at step S507, a stress distribution calculation unit 73 of the operation unit 70 calculates the stress distribution of the strengthened glass 200 in the depth direction from the surface 210, based on the difference between the refractive index distributions for the two types of light components and the photoelastic constant of the glass (the stress distribution calculation process). Note that, if the object is to calculate only the refractive index distribution, the process of step S507 is not required.

Note that the profile of the refractive index distribution and the profile of the stress distribution are similar. Accordingly, at step S507, the stress distribution calculation unit 73 may calculate, of the refractive index distributions corresponding to the P polarized light and the S polarized light, any of the following as the stress distribution: the refractive index distribution corresponding to the P polarized light; the refractive index distribution corresponding to the S polarized light; and a refractive index distribution obtained as average values of the refractive index distribution corresponding to the P polarized light and the refractive index distribution corresponding to the S polarized light.

In addition to the configuration of FIG. 15, the operation unit 70 may include a CT value calculation unit for calculating a CT value; and a DOL_Zero value calculation unit for calculating a DOL_Zero value, etc. In this case, the CT value and the DOL_Zero value can be calculated based on the stress distribution calculated by the stress distribution calculation unit 73.

As described above, with the surface refractive index measurement device and the surface refractive index measurement method according to the embodiment, the respective refractive index distributions, which correspond to the two types of light components, of the strengthened glass in the depth direction from the surface can be calculated from the positions of the three or more emission lines of each of the two types of emission line sequences.

Additionally, the stress distribution of the strengthened glass in the depth direction from the surface can be calculated, based on the difference between the refractive index distributions of the two types of light components and the photoelastic constant of the glass. Namely, the refractive index distribution and the stress distribution in the surface layer of the strengthened glass can be measured in a non-destructive manner.

As a result, a highly accurate CT value and a highly accurate DOL_Zero value can be calculated based on the measured stress distribution, and an optimum strengthening condition can be obtained in the development of the strengthened glass. Further, in the manufacturing process of the strengthened glass, highly reliable and highly accurate glass strength management is allowed, and a stronger strengthened glass can be developed and manufactured.

Second Embodiment

In the second embodiment, an example of a surface refractive index measurement device is presented, which is provided with a configuration different from that of the first embodiment. Note that, in the second embodiment, description of the components that are the same as those of the embodiment described above may be omitted.

Figure 16:
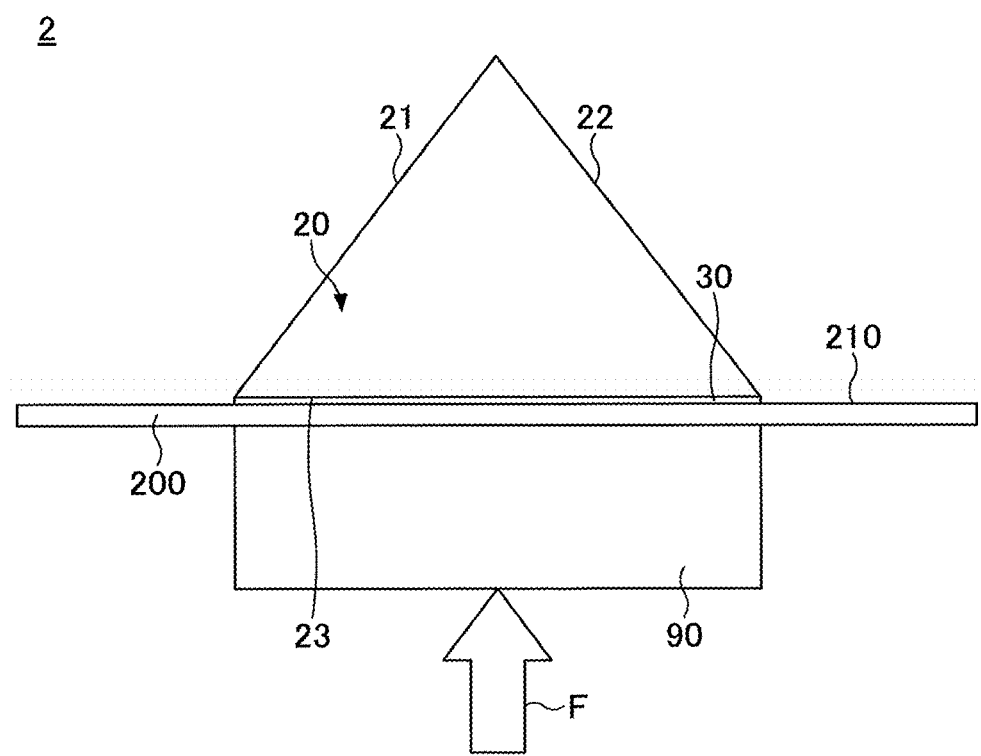
FIG. 16 is a diagram exemplifying a surface refractive index measurement device according to a second embodiment.

FIG. 16 is a diagram exemplifying the surface refractive index measurement device according to the second embodiment. However, since the light source 10, the light converting component 40, the polarizing component 50, the image sensor 60, and the operation unit 70 are configured to be the same as those of FIG. 1, depiction of these is omitted in FIG. 16.

In FIG. 16, the strengthened glass 200 contacts the light input/output component 20 of the surface refractive index measurement device 2, while interposing (intervening) the liquid 30 therebetween. A pressing component 90 provided with a flat surface having substantially the same shape as that of the bottom surface 23 of the light input/output component 20 contacts the surface of the strengthened glass 200 opposite to the light input/output component 20. Then, by the pressing component 90, force F is applied in the direction perpendicular to the surface 210 of the strengthened glass 200 toward the light input/output component 20.

Since the liquid 30 is discharged from the space between the bottom surface 23 of the light input/output component 20 and the surface 210 of the strengthened glass 200 by the force F, the thickness of the liquid 30 can be easily reduced to be less than or equal to 5 microns.

At this time, the pressing component 90 may be oscillated in a direction parallel to the strengthened glass, or ultrasonic vibration may be applied. Accordingly, the thickness of the liquid 30 can be reduced to be less than or equal to 5 microns in a short time.

Reference Example, Example

In the reference examples and the examples, emission lines were observed by a method according to related art and a method according to the present invention for a soda lime glass (reference example 1), an aluminosilicate glass (reference example 2), a soda lime glass in which tin (element symbol is Sn) diffuses on the surface (reference example 3 and example 1), a soda lime glass in which silver (element symbol Ag) diffuses on the surface (reference example 4 and example 2), and an anti-glare glass with large surface roughness (reference example 5, reference example 6, example 3, and example 4). The results of the reference examples are shown in Table 1 and FIGS. 17A through 17F, and the results of the examples are shown in Table 2 and FIGS. 18A through 18D.

TABLE 1

Figure 17C:
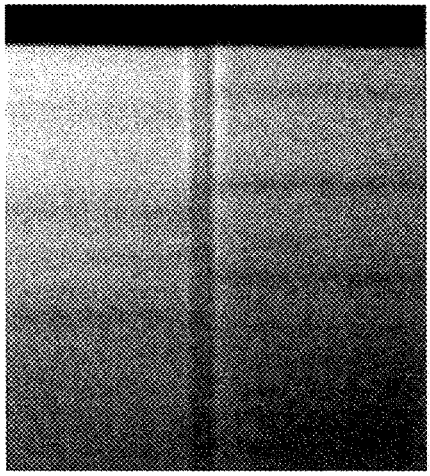
FIGS. 17A through 17F are diagrams exemplifying observation results according to reference examples.
Figure 17B:
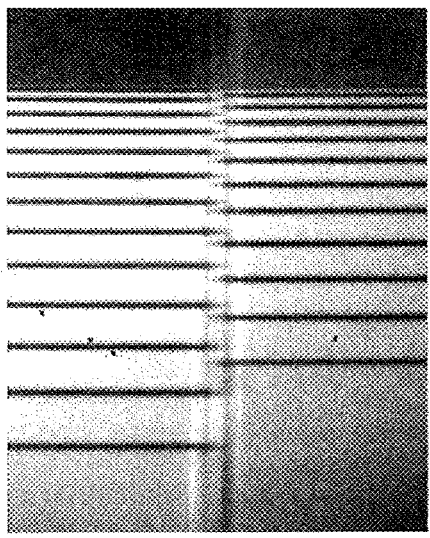
Figure 17A:
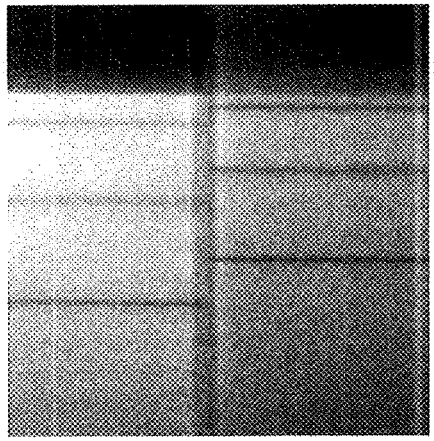
Figure 17F:
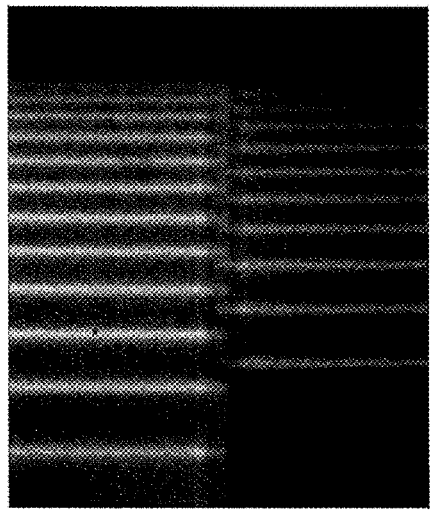
Figure 17E:
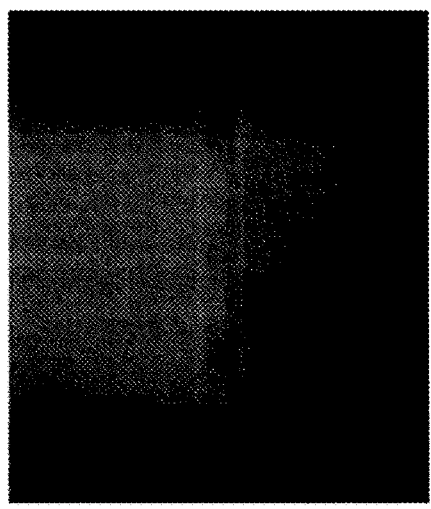
Figure 17D:
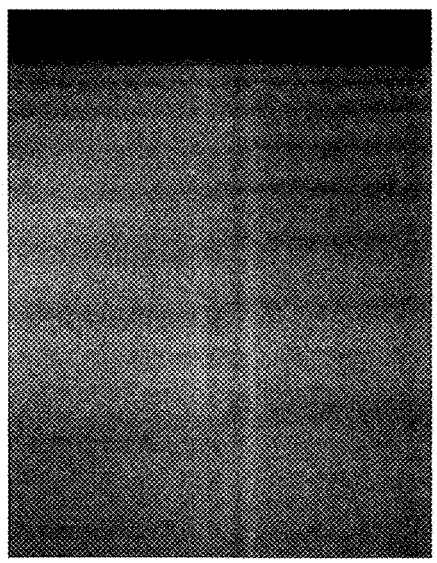

|  | Reference example 1 | Reference example 2 | Reference example 3 | Reference example 4 | Reference example 5 | Reference example 6 |
|---|---|---|---|---|---|---|
| np | 1.720 | 1.720 | 1.720 | 1.720 | 1.720 | 1.720 |
| nf | 1.640 | 1.640 | 1.640 | 1.640 | 1.640 | 1.640 |
| ngs | 1.525 | 1.515 | 1.525 | 1.530 | 1.515 | 1.515 |
| ngb | 1.518 | 1.510 | 1.518 | 1.518 | 1.510 | 1.510 |
| Metal on outermost surface | — | — | Sn | Ag | — | — |
| Ra(μm) | 0.001 | 0.001 | 0.001 | 0.001 | 0.3 | 0.1 |
| Photograph | FIG. 17A | FIG. 17B | FIG. 17C | FIG. 17D | FIG. 17E | FIG. 17F |
| Measurement method | Method of Related art | Method of Related art | Method of Related art | Method of Related art | Method of Related art | Method of Related art |
| Final evaluation | ○ | ○ | x | x | x | x |

TABLE 2

Figure 18B:
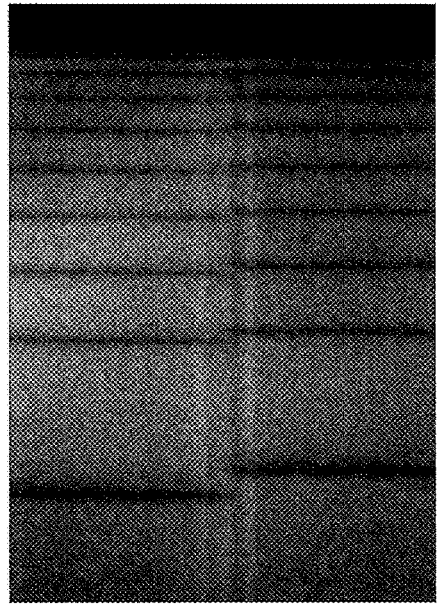
FIGS. 18A through 18D are diagrams exemplifying observation results according to the embodiment.
Figure 18D:
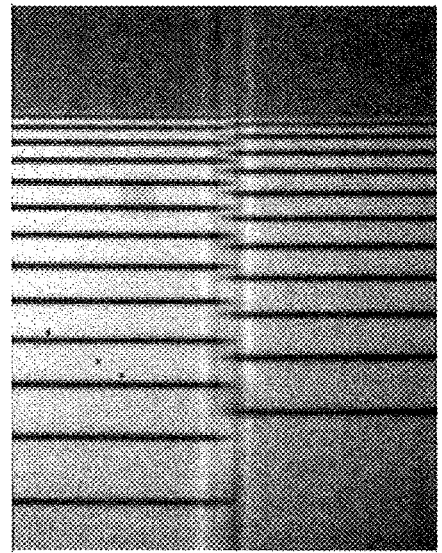
Figure 18A:
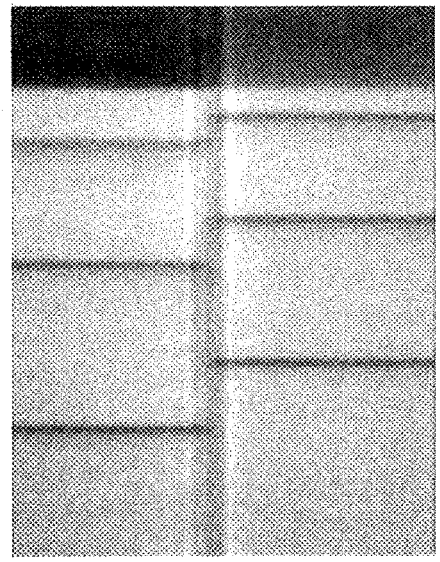
Figure 18C:
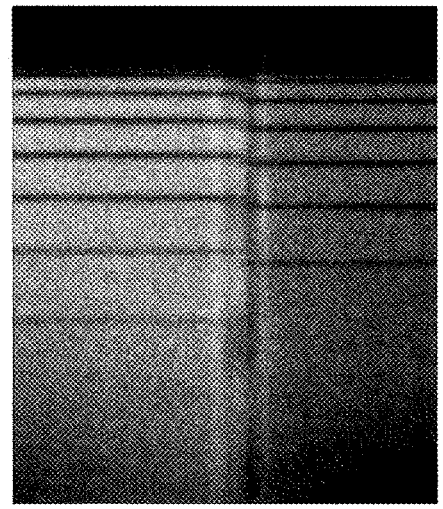

|  | Example 1 | Example 2 | Example 3 | Example 4 |
|---|---|---|---|---|
| np | 1.720 | 1.720 | 1.720 | 1.720 |
| nf | 1.525 | 1.530 | 1.515 | 1.515 |
| ngs | 1.525 | 1.530 | 1.515 | 1.515 |
| ngb | 1.518 | 1.518 | 1.510 | 1.510 |
| Metal on outermost surface | Sn | Ag | — | — |
| Ra (μm) | 0.001 | 0.001 | 0.3 | 0.1 |
| Photograph | FIG. 18A | FIG. 18B | FIG. 18C | FIG. 18D |
| Measurement method | Method of Present invention | Method of Present invention | Method of Present invention | Method of Present invention |
| Final evaluation | ○ | ○ | ○ | ○ |

Note that, in Tables 1 and 2, np is the refractive index of the light input/output component 20, nf is the refractive index of the liquid 30, ngs is the refractive index of the outermost surface of the strengthened glass 200, ngb is the refractive index of the strengthened glass 200 prior to the strengthening process, and Ra is the surface roughness of the strengthened glass 200.

Note that the method of the present invention is a case where $ngb < nf \leq ngs + 0.005$, and the method of related art is a case where $ngb < ngs < nf$.

Further, "o" in the final evaluation indicates a case where high contrast is observed and accurate measurement can be performed, and "x" indicates a case where the contrast is low and accurate measurement is unable to be performed.

As shown in Table 1 and FIGS. 17A through 17F, when measurement was performed by the method of related art, for the soda-lime glass described in reference example 1, emission lines could be observed as FIG. 17A such that measurement was possible, and for the aluminosilicate glass described in reference example 2, emission lines could be observed as reference example 2 and measurement was possible.

However, if tin (element symbol Sn) diffuses on the surface of soda lime described in reference example 3, or if silver (element symbol Ag) diffuses on the surface of the soda-lime glass described in reference example 4, in the method of related art, as shown in FIG. 17C and FIG. 17D, the emission lines (the dark lines in the photograph) became thin and the contrast was lowered, and accurate measurement could not be performed. At this time, the diffusion depths of Sn and Ti were 5 microns and 60 microns, respectively.

Further, when the anti-glare glass obtained by increasing the surface roughness of the aluminosilicate glass was measured by the method of related art, as described in reference example 5 and reference example 6, the emission lines (bright lines and dark lines in the photograph) became thinner and the contrast was reduced, as shown in FIG. 17E and FIG. 17F, respectively, and accurate measurement could not be performed.

In contrast, as shown in Table 2 and FIGS. 18A through 18D, when measurement was performed by the method of the present invention, even if tin diffuses in the soda-lime glass as described in example 1, and even if silver diffuses in the soda-lime glass as described in example 2, the high contrast of the emission lines was observed as shown in FIG. 18A and FIG. 18B, and accurate measurement could be performed.

Additionally, as described in example 3 and example 4, when the anti-glare glass obtained by increasing the surface roughness of the aluminosilicate glass was measured by the method of present invention, as shown in FIG. 18C and FIG. 18D, high contrast was observed, and accurate measurement could be performed.

As described above, by applying the method of the present invention, even if optical unevenness of the surface or in the vicinity of the surface of the strengthened glass is large, or even if optical flatness of the surface of the strengthened glass is unfavorable, emission lines with high contrast can be observed, and it is confirmed that accurate measurement can be performed.

FIG. 19 and FIG. 20 are diagrams illustrating selection of the liquid. As described in FIG. 19, when the strengthened glass in which tin (element symbol Sn) diffuses in soda-lime glass is measured, if, in the strengthened glass 200, the refractive index prior to the strengthening process is ngb=1.518 and the refractive index of the outermost surface ngs=1.525 by the chemical strengthening process, and if the refractive index nf of the liquid 30 is in the vicinity of usual 1.64, the contrast of the emission lines is unfavorable, and accurate measurement is not possible. Conversely, if nf is adjusted to be 1.518, which is the same as or less than ngb, the contrast between the white part and the black part is deteriorated, and accurate measurement is not possible.

In contrast, for example, if nf=1.520 or 1.525, emission lines with high contrast are observed, and accurate measurement can be performed.

Further, as described in FIG. 20, when the strengthened glass in which tin (element symbol Sn) diffuses in soda-lime glass is measured, if measurement is performed by adjusting the thickness d of the liquid 30 to be 50 microns when the refractive index nf of the liquid 30 is in the vicinity of usual 1.64, the contrast of the emission lines is unfavorable, and it is difficult to perform accurate measurement.

When the refractive index nf of the liquid 30 is adjusted to be equivalent to the refractive index ngs of the surface layer of the strengthened glass, and when the thickness d (microns) of the liquid 30 is reduced, though measurement is not possible at d=10 microns because interference of a mode other than that of the measurement is observed, interference modes for measurement occurs at d=0.7 microns or 0.3 microns, and accurate measurement can be performed.

The preferred embodiments and examples are described in detail above. However, it is not limited to the above-described embodiments and examples, and various modifications and substitutions can be added to the above-described embodiments and examples, without departing from the scope described in the claims.

For example, in the above-described embodiments, the light source is described as a component of the surface refractive index measurement device. However, the surface refractive index measurement device may be configured not to include a light source. In this case, the surface refractive index measurement device may be configured to include, for example, the light input/output component 20, the liquid 30, the light converting component 40, the polarizing component 50, the image sensor 60, and the operation unit 70. As for the light source, a user of the surface refractive index measurement device can prepare an appropriate one for use.

The invention claimed is:

1. A method of measuring a surface refractive index of a strengthened glass, the method comprising:
   a light supply process of causing light from a light source to enter a surface layer provided with a compressive stress layer of the strengthened glass through a liquid provided with a refractive index equivalent to a refractive index of a surface of the surface layer;
   a light output process of causing the light that propagates in the surface layer to be emitted toward outside of the strengthened glass through the liquid and a light input/output component;
   a light conversion process of converting two types of light components included in the light emitted toward outside of the strengthened glass into two types of emission line sequences, wherein the two types of light components respectively oscillate parallel to and perpendicular to a boundary surface between the strengthened glass and the liquid;
   an imaging process of capturing an image of the two types of emission line sequences;
   a position measuring process of measuring positions of respective emission lines of the two types of emission line sequences from the image obtained by the imaging process; and
   a refractive index distribution calculation process of calculating, based on a result of the measurement of the position measuring process, refractive indexes of a surface of the strengthened glass corresponding to the two types of light components, or refractive index distributions of the strengthened glass in a depth direction from the surface corresponding to the two types of light components.

2. The method of measuring the surface refractive index of the strengthened glass according to claim 1, wherein an absolute value of a difference between the refractive index of the liquid and the refractive index of the surface of the strengthened glass is less than or equal to 0.005.

3. The method of measuring the surface refractive index of the strengthened glass according to claim 1, wherein, in the light supply process and the light output process, a first surface of the light input/output component contacts the strengthened glass through the liquid,
   wherein, at least in a region of the image obtained by the imaging process, flatness of the first surface of the light input/output component is less than or equal to ¼ of a wavelength of the light from the light source, and
   wherein, in the region of the image obtained by the imaging process, an in-plane deviation of a refractive index of the first surface of the light input/output component is less than or equal to $1 \times 10^{-5}$.

4. The method of measuring the surface refractive index of the strengthened glass according to claim 1, wherein a distance d between the light input/output component and the surface of the strengthened glass is less than or equal to 5 microns.

5. The method of measuring the surface refractive index of the strengthened glass according to claim 1, wherein a surface roughness Ra of the strengthened glass is greater than or equal to 0.005 microns.

6. The method of measuring the surface refractive index of the strengthened glass according to claim 1, wherein a glass is measured such that a metal ion has been diffused in the surface layer of the strengthened glass.

7. The method of measuring the surface refractive index of the strengthened glass according to claim 1, wherein a glass is measured such that a metal ion has been diffused in the surface layer of the strengthened glass, and
wherein the metal ion is at least one selected from a group formed of Sn, Ag, Ti, Ni, Co, Cu, and In.

8. The method of measuring the surface refractive index of the strengthened glass according to claim 1, wherein the liquid provided with the refractive index is such that a filler is mixed in the liquid.

9. The method of measuring the surface refractive index of the strengthened glass according to claim 1, wherein the light input/output component is such that, on a surface that contacts the strengthened glass, a height between a region to be imaged and a non-imaging region is from 0.001 microns to 5 microns.

10. The method of measuring the surface refractive index of the strengthened glass according to claim 1, wherein, in the liquid provided with the refractive index, two or more types of liquids are mixed, and a viscosity is less than or equal to 5 cps.

11. The method of measuring the surface refractive index of the strengthened glass according to claim 1, wherein, in the liquid provided with the refractive index, two or more types of liquids are mixed, and a boiling point is higher than or equal to 100° C.

12. A method of measuring a surface stress of an enhanced glass, the method comprising:
a stress distribution calculation process of calculating a stress on the surface of the strengthened glass or a stress distribution of the strengthened glass in the depth direction from the surface, based on the positions of the respective emission lines of the two types of emission line sequences obtained by the method of measuring the surface refractive index of the strengthened glass according to claim 1.

13. The method of measuring the surface stress of the enhanced glass according to claim 12, wherein the stress distribution calculation process calculates, of the refractive index distributions corresponding to the two types of light components, any one of the refractive index distribution corresponding to at least one type of the two types of light components and average values of the refractive index distributions corresponding to the two types of light components, as the stress distribution.

14. A method of measuring a surface stress of an enhanced glass, the method comprising:
a stress distribution calculation process of calculating a stress on the surface of the strengthened glass or a stress distribution of the strengthened glass in the depth direction from the surface, based on a difference between the refractive index distributions corresponding to the two types of the light components obtained by the method of measuring the surface refractive index of the strengthened glass according to claim 1 and a photoelastic constant of the glass.

15. The method of measuring the surface stress of the enhanced glass according to claim 14, wherein the stress distribution calculation process calculates, of the refractive index distributions corresponding to the two types of light components, any one of the refractive index distribution corresponding to at least one type of the two types of light components and average values of the refractive index distributions corresponding to the two types of light components, as the stress distribution.

16. A method of measuring a surface refractive index of a strengthened glass, the method comprising:
a light supply process of causing light from a light source to enter a surface layer provided with a compressive stress layer of the strengthened glass through a liquid provided with a refractive index that is between a refractive index of a surface of the surface layer and a refractive index of a part of the strengthened glass deeper than the surface layer;
a light output process of causing the light that propagates in the surface layer to be emitted toward outside of the strengthened glass through the liquid and a light input/output component;
a light conversion process of converting two types of light components included in the light emitted toward outside of the strengthened glass into two types of emission line sequences, wherein the two types of light components respectively oscillate parallel to and perpendicular to a boundary surface between the strengthened glass and the liquid;
an imaging process of capturing an image of the two types of emission line sequences;
a position measuring process of measuring positions of respective emission lines of the two types of emission line sequences from the image obtained by the imaging process; and
a refractive index distribution calculation process of calculating, based on a result of the measurement of the position measuring process, refractive indexes of a surface of the strengthened glass corresponding to the two types of light components, or refractive index distributions of the strengthened glass in a depth direction from the surface corresponding to the two types of light components.

17. The method of measuring the surface refractive index of the strengthened glass according to claim 16, wherein, in the light supply process and the light output process, a first surface of the light input/output component contacts the strengthened glass through the liquid,
wherein, at least in a region of the image obtained by the imaging process, flatness of the first surface of the light input/output component is less than or equal to ¼ of a wavelength of the light from the light source, and
wherein, in the region of the image obtained by the imaging process, an in-plane deviation of a refractive index of the first surface of the light input/output component is less than or equal to $1 \times 10^{-5}$.

18. The method of measuring the surface refractive index of the strengthened glass according to claim 16, wherein a distance d between the light input/output component and the surface of the strengthened glass is less than or equal to 5 microns.

19. The method of measuring the surface refractive index of the strengthened glass according to claim 16, wherein a surface roughness Ra of the strengthened glass is greater than or equal to 0.005 microns.

20. The method of measuring the surface refractive index of the strengthened glass according to claim 16, wherein a glass is measured such that a metal ion has been diffused in the surface layer of the strengthened glass.

21. The method of measuring the surface refractive index of the strengthened glass according to claim 16, wherein a glass is measured such that a metal ion has been diffused in the surface layer of the strengthened glass, and
wherein the metal ion is at least one selected from a group formed of Sn, Ag, Ti, Ni, Co, Cu, and In.

22. The method of measuring the surface refractive index of the strengthened glass according to claim 16, wherein the liquid provided with the refractive index is such that a filler is mixed in the liquid.

23. The method of measuring the surface refractive index of the strengthened glass according to claim 16, wherein the light input/output component is such that, on a surface that contacts the strengthened glass, a height between a region to be imaged and a non-imaging region is from 0.001 microns to 5 microns.

24. The method of measuring the surface refractive index of the strengthened glass according to claim 16, wherein, in the liquid provided with the refractive index, two or more types of liquids are mixed, and a viscosity is less than or equal to 5 cps.

25. The method of measuring the surface refractive index of the strengthened glass according to claim 16, wherein, in the liquid provided with the refractive index, two or more types of liquids are mixed, and a boiling point is higher than or equal to 100° C.

26. A method of measuring a surface stress of an enhanced glass, the method comprising:
a stress distribution calculation process of calculating a stress on the surface of the strengthened glass or a stress distribution of the strengthened glass in the depth direction from the surface, based on the positions of the respective emission lines of the two types of emission line sequences obtained by the method of measuring the surface refractive index of the strengthened glass according to claim 16.

27. The method of measuring the surface stress of the enhanced glass according to claim 26, wherein the stress distribution calculation process calculates, of the refractive index distributions corresponding to the two types of light components, any one of the refractive index distribution corresponding to at least one type of the two types of light components and average values of the refractive index distributions corresponding to the two types of light components, as the stress distribution.

28. A method of measuring a surface stress of an enhanced glass, the method comprising:
a stress distribution calculation process of calculating a stress on the surface of the strengthened glass or a stress distribution of the strengthened glass in the depth direction from the surface, based on a difference between the refractive index distributions corresponding to the two types of the light components obtained by the method of measuring the surface refractive index of the strengthened glass according to claim 16 and a photoelastic constant of the glass.

29. The method of measuring the surface stress of the enhanced glass according to claim 28, wherein the stress distribution calculation process calculates, of the refractive index distributions corresponding to the two types of light components, any one of the refractive index distribution corresponding to at least one type of the two types of light components and average values of the refractive index distributions corresponding to the two types of light components, as the stress distribution.

* * * * *